(12) United States Patent
Komiya

(10) Patent No.: US 8,798,463 B2
(45) Date of Patent: Aug. 5, 2014

(54) OPTICAL CHANNEL MONITOR AND OPTICAL TRANSMISSION APPARATUS

(75) Inventor: Shinji Komiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 13/401,370

(22) Filed: Feb. 21, 2012

(65) Prior Publication Data

US 2012/0263459 A1  Oct. 18, 2012

(30) Foreign Application Priority Data

Apr. 13, 2011 (JP) ................................. 2011-089481

(51) Int. Cl.
*H04B 10/08* (2006.01)
*H04J 14/06* (2006.01)
*H04J 14/02* (2006.01)
*H04B 10/079* (2013.01)

(52) U.S. Cl.
CPC ....... *H04B 10/07955* (2013.01); *H04J 14/0204* (2013.01); *H04J 14/0221* (2013.01); *H04J 14/06* (2013.01); *H04J 14/0212* (2013.01)
USPC .................................. 398/34; 398/65; 398/83

(58) Field of Classification Search
USPC .......... 398/33, 83, 39, 25, 107, 177, 202–214, 398/65, 152, 184, 34, 28
See application file for complete search history.

(56) References Cited

U.S. PATENT DOCUMENTS

| | | | |
|---|---|---|---|
| 6,166,838 A * | 12/2000 | Liu et al. ............................. | 398/1 |
| 6,175,448 B1 * | 1/2001 | Xie et al. ................. | 359/484.05 |
| 6,259,529 B1 * | 7/2001 | Sorin et al. ..................... | 356/484 |
| 6,396,051 B1 * | 5/2002 | Li et al. ..................... | 250/227.18 |
| 6,704,509 B1 * | 3/2004 | Yang et al. ....................... | 398/34 |
| 6,947,139 B2 * | 9/2005 | Lee et al. ........................ | 356/364 |
| 7,035,548 B2 * | 4/2006 | Ooi et al. ....................... | 398/159 |
| 7,154,670 B2 * | 12/2006 | Zhang et al. ............. | 359/489.07 |
| 7,257,324 B2 * | 8/2007 | Chung et al. ..................... | 398/26 |
| 7,391,977 B2 * | 6/2008 | Yao ................................ | 398/152 |
| 7,680,412 B2 * | 3/2010 | Anderson et al. ................ | 398/26 |
| 7,756,369 B2 * | 7/2010 | Rudolph et al. ................. | 385/24 |
| 8,244,129 B2 * | 8/2012 | Kaneko et al. ................... | 398/65 |
| 8,254,793 B2 * | 8/2012 | Noble et al. .................... | 398/213 |
| 8,358,930 B2 * | 1/2013 | Gariepy et al. ................. | 398/26 |
| 8,364,034 B2 * | 1/2013 | He et al. .......................... | 398/25 |
| 2002/0141010 A1 * | 10/2002 | Rodgers et al. ............... | 359/110 |
| 2003/0219250 A1 * | 11/2003 | Wein et al. ....................... | 398/26 |

(Continued)

FOREIGN PATENT DOCUMENTS

JP      2001-244557     9/2001

*Primary Examiner* — Ken Vanderpuye
*Assistant Examiner* — Dibson Sanchez
(74) *Attorney, Agent, or Firm* — Fujitsu Patent Center

(57) ABSTRACT

The optical channel monitor includes a polarization adjuster, a wavelength divider, a polarization divider, a first intensity detector, and a second intensity detector. The polarization adjuster adjusts the plane of polarization of a first optical signal to a first direction and the plane of polarization of a second optical signal to a second direction. The wavelength divider divides each of the optical signals multiplexed on the first and second optical signals, in accordance with the wavelengths. The polarization divider divides each of the divided optical signals, based on the direction of the plane of polarization. The first intensity detector receives an optical signal whose direction of the plane of polarization is the first direction among the divided optical signals. The second intensity detector receives an optical signal whose direction of the plane of polarization is the second direction.

7 Claims, 23 Drawing Sheets

(56) References Cited

U.S. PATENT DOCUMENTS

| | | | |
|---|---|---|---|
| 2003/0223056 A1* | 12/2003 | Fu et al. | 356/73.1 |
| 2004/0114923 A1* | 6/2004 | Chung et al. | 398/26 |
| 2004/0264981 A1* | 12/2004 | Zhang et al. | 398/204 |
| 2005/0174919 A1* | 8/2005 | Chang et al. | 369/112.16 |
| 2006/0239684 A1* | 10/2006 | Oguma | 398/83 |
| 2007/0014513 A1* | 1/2007 | Isomura et al. | 385/24 |
| 2009/0162067 A1* | 6/2009 | Kobayashi et al. | 398/79 |
| 2010/0221004 A1* | 9/2010 | Haslam et al. | 398/49 |
| 2012/0051737 A1* | 3/2012 | Deandrea | 398/25 |
| 2012/0093501 A1* | 4/2012 | He et al. | 398/26 |
| 2012/0230681 A1* | 9/2012 | Ueki et al. | 398/34 |
| 2012/0301137 A1* | 11/2012 | Sakamoto | 398/16 |

* cited by examiner

OPTICAL CHANNEL MONITOR AND OPTICAL TRANSMISSION APPARATUS

CROSS-REFERENCE TO RELATED APPLICATION

This application is based upon and claims the benefit of priority of the prior Japanese Patent Application No. 2011-089481, filed on Apr. 13, 2011, the entire contents of which are incorporated herein by reference.

FIELD

The embodiments discussed herein are directed to an optical channel monitor and an optical transmission apparatus.

BACKGROUND

Recently, wavelength division multiplexing (WDM) with which optical signals of different wavelengths are multiplexed for data transmission has been known as a communication method that realizes large volume data communications. In an optical communication system adopting the WDM, a wavelength selectable switch (WSS) is used in an optical transmission apparatus to multiplex optical signals of any wavelengths and transfer them to a targeted output destination. As the WSS, a type that has an one-port input and a multi-port output (drop-type WSS) and a type that has a multi-port input and a one-port output (add-type WSS) are known.

If the WSS is of the add type, an optical channel monitor (OCM) is incorporated together with the WSS in the optical transmission apparatus to detect the intensities of the optical signals output by the WSS in accordance with their wavelengths. The optical transmission apparatus controls the amount of attenuation for each wavelength at the WSS so that the intensity detected by the OCM for each wavelength reaches a target value.

Here, the structure of a conventional OCM is explained. FIG. 24 is a diagram for explaining an example of a conventional OCM. As illustrated in FIG. 24, when an optical signal obtained by multiplexing optical signals of different wavelengths is input, the conventional OCM collimates the input optical signal by the first optical system such as a lens, and guides it to a wavelength dividing unit. The wavelength dividing unit is provided with a wavelength tunable filter to allow an optical signal of a specific wavelength to pass through, and thereby divides the received optical signal into different wavelengths. For example, the wavelength dividing unit divides the received optical signal into wavelengths by controlling the temperature of the wavelength tunable filter and the incident angle of the optical signal with respect to the wavelength tunable filter and thereby changing the passing wavelengths at regular intervals of time. Then, an intensity detecting unit that is provided with a photo diode (PD) receives optical signals that are divided by the wavelength dividing unit, and detects the intensities of these optical signals in accordance with the wavelengths.

In the explanation of FIG. 24, the OCM that divides the optical signal into wavelengths by use of a wavelength tunable filter has been introduced, but an OCM that uses a diffraction grating in place of the wavelength tunable filter to divide an optical signal into wavelengths is also known. Furthermore, an OCM that uses a diffraction grating and a micro electro mechanical system (MEMS) mirror to divide an optical signal into wavelengths is also known.

Patent Document 1: Japanese Laid-open Patent Publication No. 2001-244557

However, multiple OCMs are often used together with the WSS in the optical transmission apparatus, and they are realized by space optical systems. It is therefore difficult to downsize an apparatus having multiple optical channel monitors. For example, a reconfigurable optical add/drop multiplexer (ROADM) incorporated in an optical transmission apparatus that is positioned at a node in the ring-type network is considered. In such a structure, an OCM is used with an add-type WSS for each of EAST-WEST and WEST-EAST, which increases the size of the apparatus.

Here, to downsize an apparatus having multiple OCM, a structure of combining the OCMs into one may be considered. For example, as illustrated in FIG. 25, the wavelength dividing units of two OCMs (OCM 1 and OCM 2) share a wavelength tunable filter so that two OCMs can be combined. FIG. 25 is a diagram for illustrating a structure in which two OCMs are combined.

However, a crosstalk problem that an optical signal passing through one OCM leaks into another OCM resides in the structure in which multiple OCMs are simply combined. In the example of FIG. 25, an optical signal that passes through the OCM 1 may leak into the OCM 2.

SUMMARY

According to an aspect of an embodiment of the invention, an optical channel monitor includes a polarization adjuster configured to adjust, of a first optical signal and a second optical signal that are multiple wavelength light, a direction of a plane of polarization of the first optical signal to a first direction and a direction of a plane of polarization of the second optical signal to a second direction that is orthogonal to the first direction; a wavelength divider configured to divide each of optical signals that are multiplexed on the first optical signal and the second optical signal each having the direction of the plane of polarization adjusted by the polarization adjuster, in accordance with wavelengths; a polarization divider configured to divide each of the optical signals divided by the wavelength divider in accordance with the wavelengths, based on the direction of the plane of polarization; a first intensity detector configured to receive an optical signal whose direction of the plane of polarization is the first direction from among the optical signals divided by the polarization divider, and detect an intensity of the first optical signal in accordance with the wavelengths; and a second intensity detector configured to receive an optical signal whose direction of the plane of polarization is the second direction from among the optical signals divided by the polarization divider and detect an intensity of the second optical signal in accordance with the wavelengths.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The technology disclosed herein is not be limited to the following embodiments.

[a] First Embodiment

Figure 1:
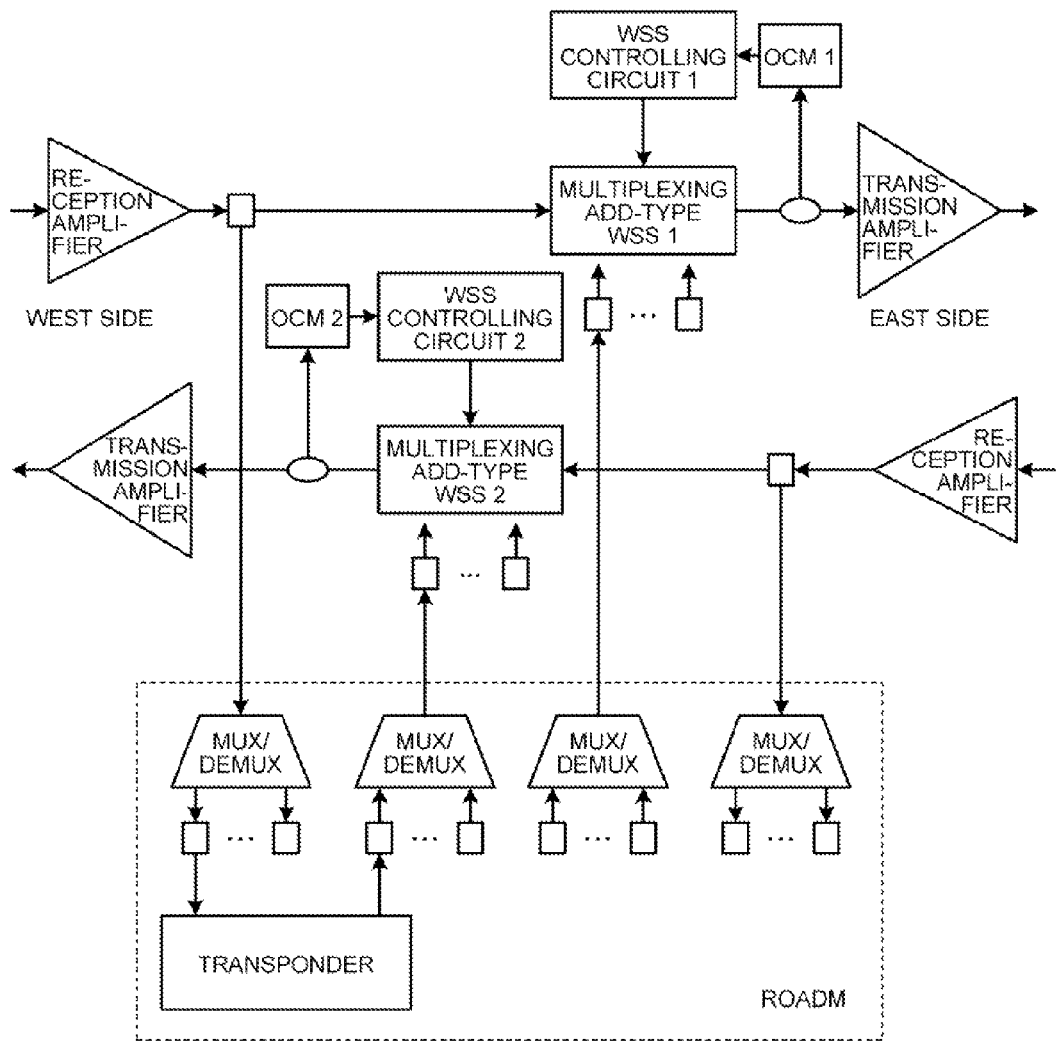
FIG. 1 is a diagram for explaining an optical transmission apparatus in which OCMs according to the first embodiment are installed.

First, an optical transmission apparatus incorporating an optical channel monitor (OCM) therein according to the first embodiment is explained, and then the structure of the OCM according to the first embodiment is explained. FIG. 1 is a diagram for explaining the optical transmission apparatus incorporating an OCM therein according to the first embodiment.

The optical transmission apparatus illustrated in FIG. 1 may be positioned at a node in a ring network to transmit an optical signal obtained by multiplexing optical signals of different wavelengths from EAST to WEST or from WEST to EAST. In addition, the optical transmission apparatus includes a reconfigurable optical add/drop multiplexer (ROADM). Then, the optical transmission apparatus transmits information from a not-illustrated terminal to the network or from the network to a not-illustrated terminal by use of the ROADM.

Here, the optical transmission apparatus employs a wavelength selectable switch (WSS) to multiplex optical signals of any wavelengths and transmit them to a targeted output destination. For example, the optical transmission apparatus includes a multiplexing add-type WSS 1 and a multiplexing add-type WSS 2, as illustrated in FIG. 1.

The multiplexing add-type WSS 1 multiplexes an optical signal that is received by a reception amplifier on the WEST side of the network and an optical signal of a specific wavelength transmitted from the ROADM, and transfers the resultant signal to a transmission amplifier on the EAST side. Then, the EAST transmission amplifier transmits the optical signal multiplexed by the multiplexing add-type WSS 1 to the EAST side of the network.

The multiplexing add-type WSS 2 multiplexes an optical signal received by a reception amplifier on the EAST side of the network and an optical signal of a specific wavelength transferred from the ROADM, and transmits the resultant signal to the WEST transmission amplifier. Then, the WEST transmission amplifier transmits the optical signal multiplexed by the multiplexing add-type WSS 2 to the WEST side of the network.

Furthermore, the optical transmission apparatus detects the intensity of an optical signal output by a WSS for different wavelengths by use of OCMs. For example, the optical transmission apparatus includes an OCM 1 and an OCM 2, as illustrated in FIG. 1.

The OCM 1 detects the intensity of an optical signal output from the multiplexing add-type WSS 1 for each of its wavelengths, and feeds the intensity of the optical signal for each of the wavelengths back to a WSS controlling circuit 1 configured to control the multiplexing add-type WSS 1. Then, the WSS controlling circuit 1 controls the amount of attenuation for each of the wavelengths in the multiplexing add-type WSS 1 so that the intensity of the optical signal detected by the OCM 1 for the wavelengths reaches the target value. For example, the WSS controlling circuit 1 adjusts the angle of the MEMS mirror in the multiplexing add-type WSS 1 to control the amount of attenuation for each wavelength in the multiplexing add-type WSS 1.

The OCM 2 detects the intensity of the optical signal output from the multiplexing add-type WSS 2 for different wavelengths, and feeds the intensity of the optical signal detected for each of the wavelengths back to a WSS controlling circuit 2 configured to control the multiplexing add-type WSS 2. Then, the WSS controlling circuit 2 controls the amount of attenuation for each of the wavelengths in the multiplexing add-type WSS 2 so that the intensity of the optical signal detected for each of the wavelengths by the OCM 2 reaches the target value. For example, the WSS controlling circuit 2 adjusts the angle of the MEMS mirror of the multiplexing add-type WSS 2 to control the amount of attenuation for each wavelength in the multiplexing add-type WSS 2.

The ROADM that is used to exchange optical signals between a not-illustrated terminal or the like and the network is configured to multiplex and demultiplex optical signals of specific wavelengths that are to be sent to the multiplexing add-type WSS. For example, the ROADM includes a transponder and multiplexers/demultiplexers (MUXs/DEMUXs), as illustrated in FIG. 1. When information received from the not-illustrated terminal or the like is to be transmitted to the network, the transponder converts the information received from the terminal or the like to a suitable signal rate, and corrects errors with the forward error correction (FEC) code or the like. Then, the transponder modulates the output wavelength to any desired wavelength by laser and outputs it to the MUX/DEMUX.

The MUX/DEMUX multiplexes optical signals of specific wavelengths into an optical signal, and demultiplexes a multiplexed optical signal into optical signals of specific wavelengths. For example, the MUX/DEMUX multiplexes optical signals of certain wavelengths into one optical signal from among the optical signals that are input from the transponder, and transfers it to the multiplexing add-type WSS.

In addition, when information is to be sent from the network to the not-illustrated terminal, the MUX/DEMUX divides a multiplexed optical signal to obtain an optical signal of a specific wavelength only, and transfers it to the transponder. Then, the transponder corrects an error by FEC code or the like, and outputs the signal to the not-illustrated terminal.

In this manner, the optical transmission apparatus multiplexes optical signals of any wavelengths at a node in the network by use of two WSSs (the multiplexing add-type WSS 1 and the multiplexing add-type WSS 2) and transfers the resultant signal to a targeted output destination. Furthermore, the optical transmission apparatus detects the intensities of the optical signals output from the two WSSs for different wavelengths by use of two OCMs (the OCM 1 and the OCM 2). In other words, the optical transmission apparatus adopts two OCMs together with two WSSs, which tends to increase the size of the apparatus.

Figure 2:
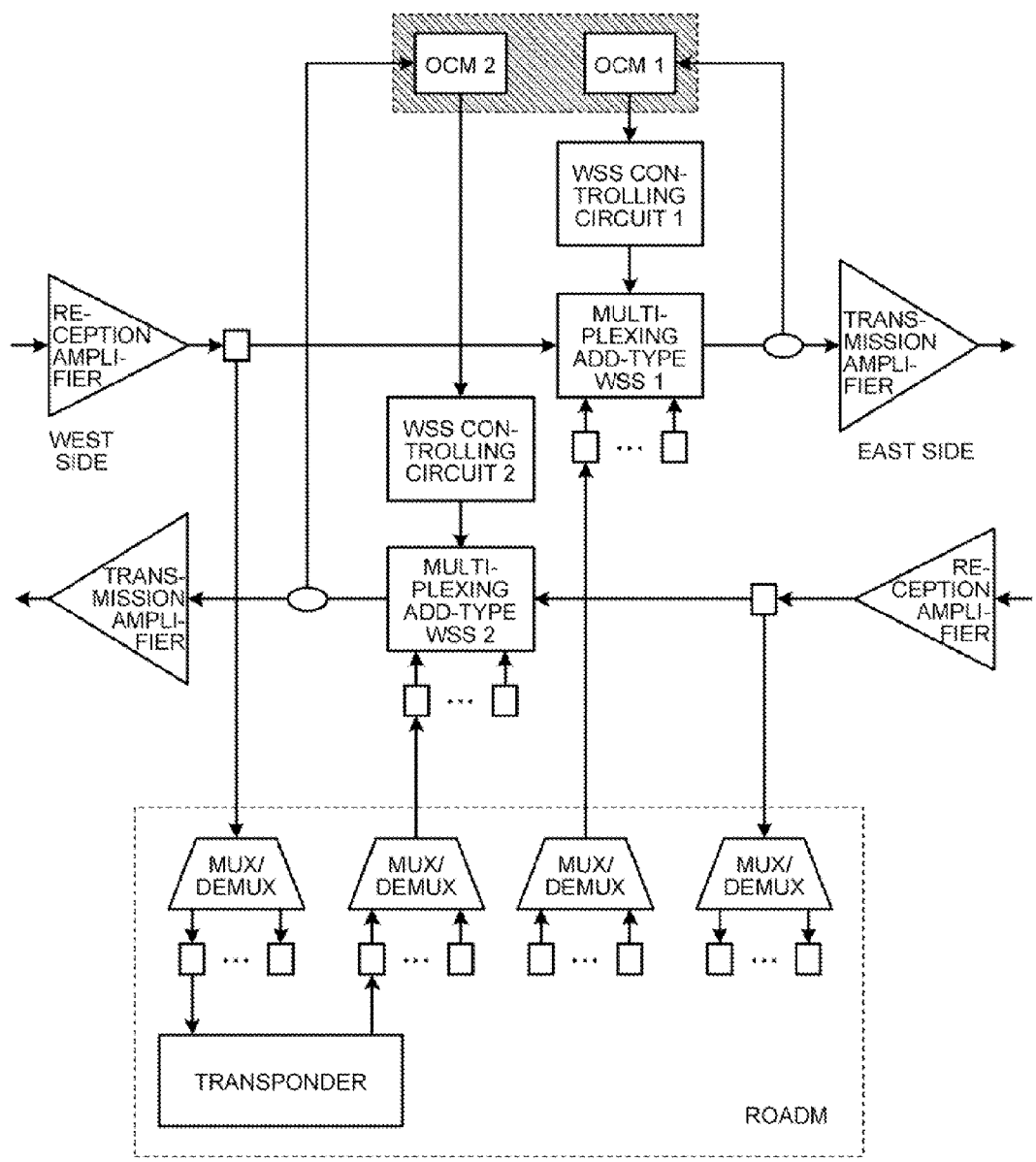
FIG. 2 is a diagram for explaining the installation position of the OCMs according to the first embodiment.

According to the present embodiment, two OCMs are combined into one so that the apparatus can be downsized. However, in a structure in which two OCMs are simply combined into one, a crosstalk is likely to occur, in which an optical signal that passes through one OCM escapes to the other OCM. For this reason, according to the present embodiment, an optical signal that performs transmission for one OCM and an optical signal that performs transmission for the other OCM are divided in directions separating from each other to avoid a crosstalk. First, the installation position of the OCM according to the first embodiment is explained with reference to FIG. 2. FIG. 2 is a diagram for explaining the installation position of the OCM according to the first embodiment.

As illustrated in FIG. 2, the OCM according to the first embodiment is installed at the positions of the OCM 1 and the OCM 2 in the optical transmission apparatus illustrated in FIG. 1. In other words, the OCM according to the first embodiment is the OCM 1 and the OCM 2 that are combined into one in such a manner that it has the functions of both the OCM 1 and the OCM 2.

Figure 3:
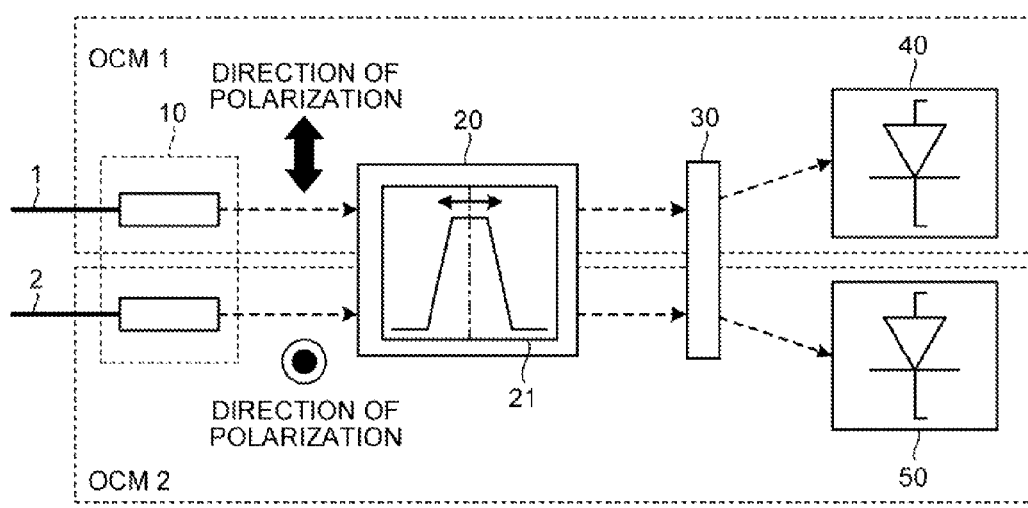
FIG. 3 is a diagram for explaining the structure of the OCM according to the first embodiment.

Next, the structure of the OCM according to the first embodiment is explained. FIG. 3 is a diagram for explaining the structure of the OCM according to the first embodiment. The OCM indicated in FIG. 3 is provided with an OCM 1 having the same function as the OCM 1 indicated in FIG. 2 and an OCM 2 having the same function as the OCM 2 indicated in FIG. 2.

The OCM includes an input port 1 and an input port 2 in the OCM 1 and the OCM 2, respectively. To the input port 1 of the OCM 1, a first optical signal, which is multiple wavelength light output from the WSS, is input. For example, the first optical signal that is multiple wavelength light output by the multiplexing add-type WSS 1 of the optical transmission apparatus indicated in FIG. 2 is input to the input port 1 of the OCM 1. To the input port 2 of the OCM 2, a second optical signal, which is multiple wavelength light output from the WSS, is input. For example, the second optical signal that is multiple wavelength light output from the multiplexing add-type WSS 2 of the optical transmission apparatus indicated in FIG. 2 is input to the input port 2 of the OCM 2.

Moreover, the OCM indicated in FIG. 3 includes a first optical system 10, a wavelength dividing unit 20, a second optical system 30, a first intensity detecting unit 40, and a second intensity detecting unit 50. The wavelength dividing unit 20, the first intensity detecting unit 40, and the second intensity detecting unit 50 can be reworded as the wavelength divider 20, the first intensity detector 40, and the second intensity detector 50, respectively.

Regarding the first optical signal and the second optical signal, which are both multiple wavelength light, the first optical system 10 adjusts the direction of the plane of polarization of the first optical signal to the first direction, and the direction of the plane of polarization of the second optical signal to the second direction that is orthogonal to the first direction. More specifically, the first optical system 10 adjusts the direction of the plane of polarization of the first optical signal, which is an optical signal input through the input port 1 of the OCM 1, to the first direction. Moreover, the first optical system 10 adjusts the direction of the plane of polarization of the second optical signal, which is an optical signal input through the input port 2 of the OCM 2, to the second direction that is orthogonal to the first direction. The first optical system 10 is an example of a polarization adjusting unit. The polarization adjusting unit can be reworded as a polarization adjuster. Hereinafter, the direction of the plane of polarization may be referred to as the direction of polarization.

Figure 4:
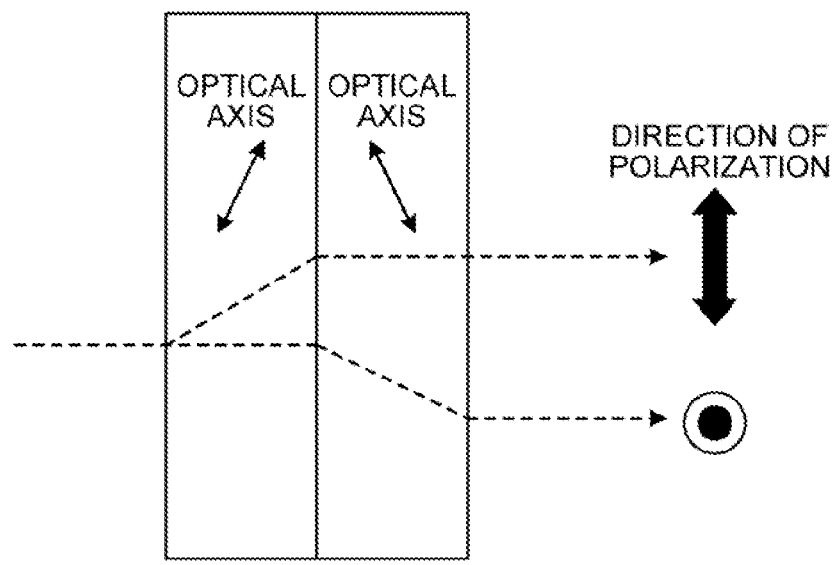
FIG. 4 is a diagram for explaining the first optical system.
Figure 5:
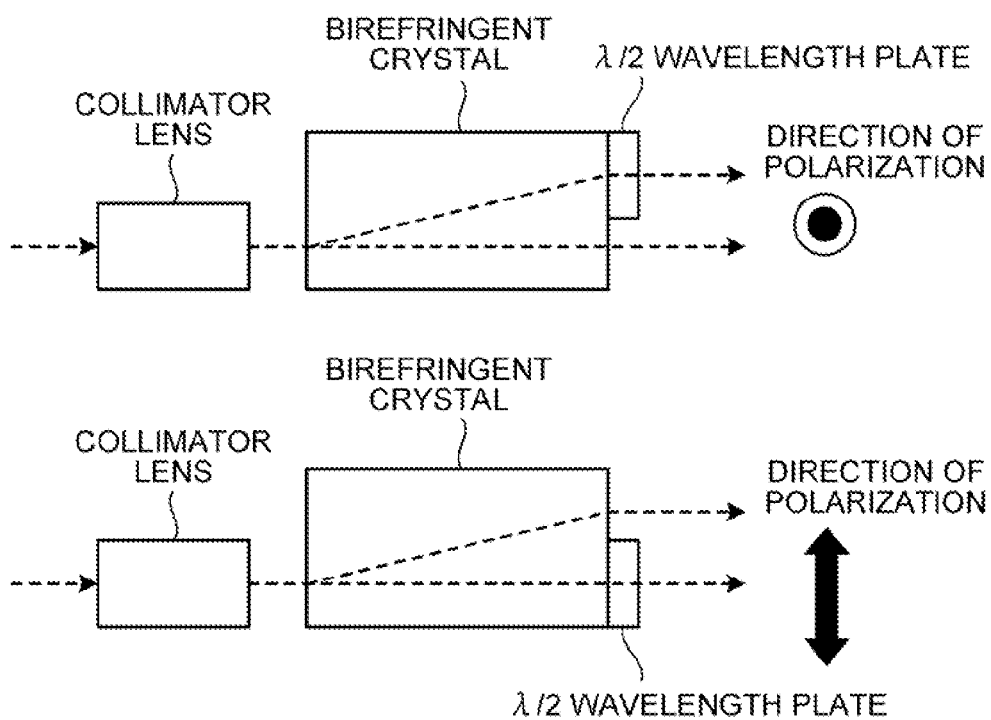
FIG. 5 is a diagram for explaining the first optical system.

Here, an example of the first optical system 10 adjusting the direction of polarization of an optical signal is explained. FIGS. 4 and 5 are diagrams for explaining the first optical system 10. In FIGS. 4 and 5, the first optical system 10 is viewed from above.

For example, the first optical system 10 includes, as a polarizer, a birefringent crystal obtained by attaching two crystals that have different optical axes, as illustrated in FIG. 4. By use of this birefringent crystal, the first optical system 10 adjusts the direction of polarization of an optical signal to a parallel direction or a vertical direction with respect to the ground. Then, as illustrated in FIG. 5, the first optical system 10 arranges λ/2 wavelength plates at different positions so that it can control the direction of polarization of the first optical signal input through the input port 1 of the OCM 1 and the direction of polarization of the second optical signal input through the input port 2 of the OCM 2 to make them orthogonal to each other.

For example, as illustrated in FIG. 5, the first optical system 10 of the OCM 1 has a λ/2 wavelength plate at a position where an optical signal with its direction of polarization adjusted to a direction parallel to the ground is output, among the optical signals that are incident on the birefringent crystals by way of a collimator lens and have their directions of polarization adjusted. Thus, the direction of polarization of the optical signal that has been in a direction parallel to the ground is now turned 90 degrees at the λ/2 wavelength plate and changed to a direction vertical to the ground so that the direction of polarization of all the optical signals that pass through the first optical system 10 of the OCM 1 becomes vertical to the ground.

On the other hand, the first optical system 10 of the OCM 2 has a λ/2 wavelength plate at a position where an optical signal with its direction of polarization adjusted to a direction vertical to the ground is output, among the optical signals that are incident on the birefringent crystal by way of the collimator lens and have their directions of polarization adjusted. Thus, the direction of polarization of the optical signal whose direction of polarization has been vertical to the ground is now turned 90 degrees by the λ/2 wavelength plate and changed to a direction parallel to the ground, and the direction of polarization of all the optical signals that pass through the first optical system 10 of the OCM 2 becomes parallel to the ground.

In FIG. 3, the wavelength dividing unit 20 divides optical signals that are multiplexed on the first optical signal and the second optical signal whose directions of the planes of polarization are adjusted by the first optical system 10, in accordance with their wavelengths. More specifically, the wavelength dividing unit 20 includes a wavelength tunable filter 21 that allows an optical signal of a specific wavelength to pass through, and thereby divides the optical signals that are multiplexed on the first optical signal and the second optical signal whose directions of the planes of polarization are adjusted by the first optical system 10, in accordance with their wavelengths.

For example, the wavelength dividing unit 20 controls the temperature of the wavelength tunable filter 21 or the incident angle of the optical signal on the wavelength tunable filter 21 to vary the passing wavelength at regular intervals. In this manner, after being input through the input port 1 of the OCM 1, the first optical signal with its direction of polarization adjusted is divided in accordance with the wavelengths. Furthermore, the wavelength dividing unit 20 divides the optical signals that are multiplexed on the second optical signal whose direction of polarization is adjusted after being input through the input port 2 of the OCM 2, in accordance with the wavelengths.

The second optical system 30 divides the optical signals that are divided by the wavelength dividing unit 20 in accordance with wavelengths, into different directions based the direction of the plane of polarization. More specifically, the second optical system 30 divides the first optical signal whose direction of polarization is adjusted to the first direction and the second optical signal whose direction of polarization is adjusted to the second direction orthogonal to the first direction, into different travelling directions. The second optical system 30 is an example of a polarization dividing unit. The polarization dividing unit can be reworded as a polarization divider.

Figure 6:
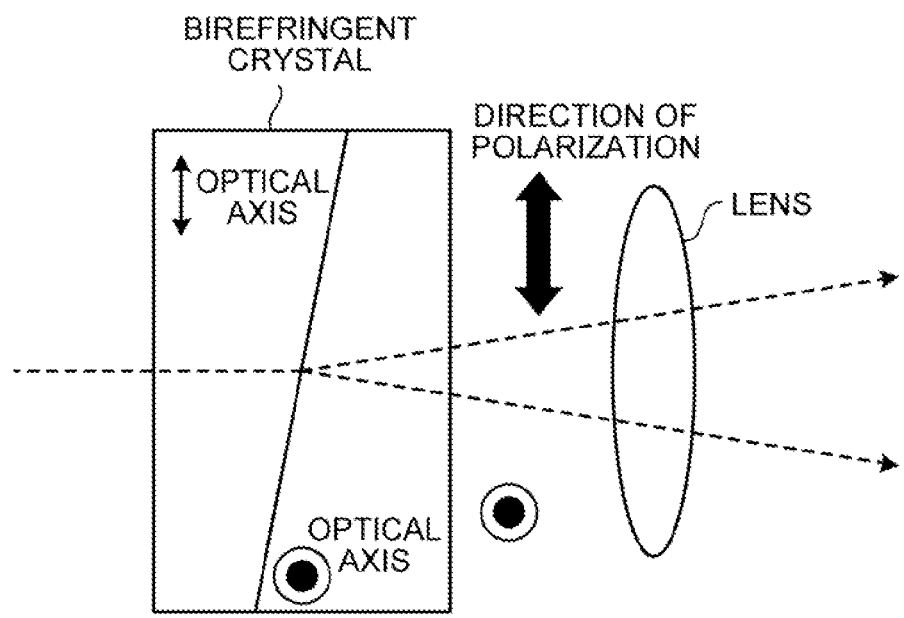
FIG. 6 is a diagram for explaining the second optical system.

An example of the second optical system 30 controlling the travelling direction of an optical signal based on the direction of polarization is now explained. FIG. 6 is a diagram for explaining the second optical system 30. In FIG. 6, the second optical system 30 is viewed from the side.

For example, the second optical system 30 includes, as illustrated in FIG. 6, a polarization beam splitter that includes a birefringent crystal in which a crystal whose optical axis is vertical to the ground and a crystal whose optical axis is parallel to the ground are diagonally attached together. Then, the second optical system 30 uses the polarization beam splitter to output upwardly the incident optical signal having the direction of polarization vertical to the ground, and output downwardly the incident optical signal having the direction of polarization parallel to the ground. Then, the second optical system 30 uses a lens arranged downstream of the birefringent crystal to collect the optical signals that are split in the upward and downward directions.

For example, the second optical system 30 outputs upwardly the optical signal of the OCM 1 whose direction of polarization is vertical to the ground, and outputs downwardly the optical signal of the OCM 2 whose direction of polarization is parallel to the ground. Moreover, the second optical system 30 collects the upwardly output optical signal of the OCM 1 and the downwardly output optical signal of the OCM 2 so that the optical signal of the OCM 1 and the optical signal of the OCM 2 can be split in directions separating from each other.

In FIG. 3, the first intensity detecting unit 40 receives the optical signal whose plane of polarization is in the first direction from among the optical signals split by the second optical system 30, and detects the intensity of the first optical signal for each wavelength. For example, the first intensity detecting unit 40 includes a photoreceptor (photo diode, PD). It receives the optical signal of the OCM 1 that has the direction of polarization vertical to the ground and is upwardly output by the second optical system 30, and detects the intensity of the first optical signal input through the input port 1 of the OCM 1 for each wavelength.

The first intensity detecting unit 40 feeds the intensity of the first optical signal detected for each wavelength back to a WSS controlling circuit that controls the WSS. For example, the first intensity detecting unit 40 sends the detected intensities of the first optical signal to the WSS controlling circuit 1 illustrated in FIG. 2, as feedback. Then, the WSS controlling circuit 1 controls the amount of attenuation in the multiplexing add-type WSS 1 for each wavelength in such a manner that the intensity of the first optical signal reaches the target value for each wavelength.

The second intensity detecting unit 50 receives the optical signal whose plane of polarization is in the second direction, among the optical signals split by the second optical system 30, and detects the intensity of the second optical signal for each wavelength. For example, the second intensity detecting unit 50 includes a PD to receive the optical signal of the OCM 2 that is downwardly output by the second optical system 30 and has the direction of polarization parallel to the ground, and to detect the intensity of the second optical signal input through the input port 2 of the OCM 2 for each wavelength.

The second intensity detecting unit 50 feeds the detected intensities of the second optical signal for the wavelengths back to the WSS controlling circuit that controls the WSS. For example, the second intensity detecting unit 50 sends the detected intensities of the second optical signal for the wavelengths to the WSS controlling circuit 2 indicated in FIG. 2, as feedback. Then, the WSS controlling circuit 2 controls the amount of attenuation in the multiplexing add-type WSS 2 for the wavelengths in such a manner that the intensities of the second optical signal for the wavelengths reach the target values.

Figure 7:
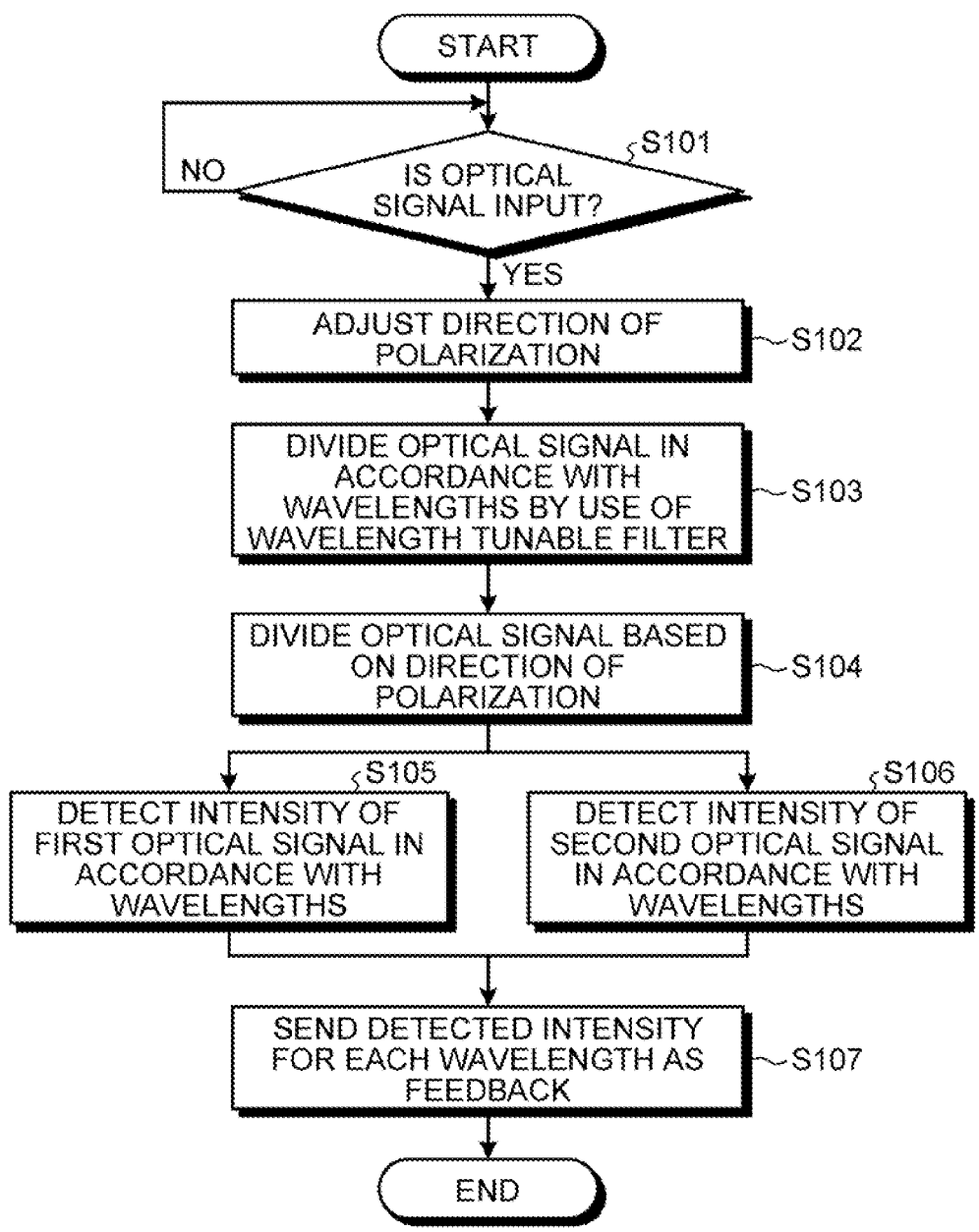
FIG. 7 is a flowchart for illustrating the procedure of a process performed by the OCM according to the first embodiment.

Next, the procedure of the process performed by the OCM according to the first embodiment is explained. FIG. 7 is a flowchart of the procedure of the process performed by the OCM according to the first embodiment. As indicated in FIG. 7, the OCM according to the first embodiment waits until an optical signal is input through an input port (no at step S101).

When an optical signal is input through the input port (yes at step S101), the first optical system 10 of the OCM adjusts the direction of polarization of the input optical signal (step S102). More specifically, the first optical system 10 adjusts the direction of polarization of the first optical signal that is input through the input port 1 of the OCM 1 to the first direction and the direction of polarization of the second optical signal input through the input port 2 of the OCM 2 to the second direction that is orthogonal to the first direction.

Then, the wavelength dividing unit 20 divides each of the optical signals that are multiplexed on the first and second optical signals whose directions of polarization are adjusted by the first optical system 10, in accordance with the wavelengths (step S103). More specifically, the wavelength dividing unit 20 uses the wavelength tunable filter 21 to divide each of the optical signals that are multiplexed on the first optical signal input through the input port 1 of the OCM 1 and the second optical signal input through the input port 2 of the OCM 2, in accordance with the wavelengths.

Then, the second optical system 30 divides each of the optical signals divided by the wavelength dividing unit 20 in accordance with the wavelengths, into different directions based on the direction of polarization (step S104). More specifically, the second optical system 30 divides the first optical signal whose direction of polarization is adjusted to the first direction and the second optical signal whose direction of polarization is adjusted to the second direction orthogonal to the first direction, into different travelling directions.

Thereafter, the first intensity detecting unit 40 receives the optical signal whose direction of polarization is the first direction from among the optical signals that are divided by the wavelength dividing unit 20 in accordance with the wavelengths and further divided by the second optical system 30 in accordance with the directions of polarization, and detects the intensities of the first optical signal for the wavelengths (step S105). For example, the first intensity detecting unit 40 uses the PD to receive the optical signal of the OCM 1 that is output by the second optical system 30 in a direction separating from the OCM 2 and has the direction of polarization vertical to the ground, and to detect the intensities of the first optical signal that is input through the input port 1 of the OCM 1 in accordance with wavelengths.

On the other hand, the second intensity detecting unit 50 receives an optical signal whose direction of polarization is the second direction, among the optical signals divided by the wavelength dividing unit 20 in accordance with wavelengths, and further divided by the second optical system 30 in accordance with the directions of polarization, and detects the intensities of the second optical signal in accordance with the wavelengths (step S106). For example, the second intensity detecting unit 50 uses the PD to receive the optical signal of the OCM 2 that is output in the direction separating from the OCM 1 by the second optical system 30 and has the direction of polarization parallel to the ground, and to detect the intensities of the second optical signal input through the input port 2 of the OCM 2 in accordance with the wavelengths.

Thereafter, the first intensity detecting unit 40 and the second intensity detecting unit 50 each supply the detected intensities of the optical signals for each wavelength to the WSS controlling circuit that controls the WSS, as feedback (step S107), and the process is terminated.

As discussed above, according to the first embodiment, the first optical system 10 adjusts the direction of the plane of polarization of the first optical signal input through the input port 1 of the OCM 1, which is multiple wavelength light, to the first direction. Moreover, the first optical system 10 adjusts the direction of the plane of polarization of the second optical signal input through the input port 2 of the OCM 2, which is multiple wavelength light, to the second direction that is orthogonal to the first direction. Then, the wavelength dividing unit 20 divides each of the optical signals multiplexed on the first and second optical signals whose directions of the planes of polarization are adjusted by the first optical system 10, in accordance with the wavelengths. Thereafter, the second optical system 30 divides each of the optical signals divided by the wavelength dividing unit 20 in accordance with the wavelengths, into different directions based on the direction of the plane of polarization. The first intensity detecting unit 40 receives an optical signal whose direction of the plane of polarization is the first direction from among the optical signals divided by the second optical system 30, and detects the intensity of the first optical signal for each of the wavelengths. Then, the second intensity detecting unit 50 receives an optical signal whose direction of the plane of polarization is the second direction from among the optical signals divided by the second optical system 30, and detects the intensity of the second optical signal for each of the wavelengths. Thus, the first optical signal that passes through the OCM 1 and the second optical signal that passes through the OCM 2 can be reliably divided with a single wavelength dividing unit 20. Hence, the two OCMs can be combined into one body, and an apparatus including the multiple OCMs can be downsized. Furthermore, the first optical signal that passes through the OCM 1 and the second optical signal that passes through the OCM 2 are divided in directions separating from each other, and the divided first and second optical signals are received by the first intensity detecting unit 40 and the second intensity detecting unit 50, respectively. Thus, crosstalk can be prevented from occurring. In other words, crosstalk can be avoided, while the apparatus including multiple OCMs can be downsized.

In addition, according to the first embodiment, the second optical system 30 adopts a polarization beam splitter that includes a birefringent crystal obtained by diagonally attaching two crystals whose optical axes are orthogonal to each other to divide each of the optical signals that have been divided in accordance with the wavelengths, into different directions based on the directions of the planes of polarization. Thus, two optical signals whose directions of the planes of polarization are orthogonal to each other can be easily divided in directions separating from each other, and crosstalk can be effectively avoided.

Furthermore, according to the first embodiment, the wavelength dividing unit 20 uses a wavelength tunable filter that allows an optical signal of a specific wavelength to pass through to divide each of the optical signals multiplexed on the first and second optical signals in accordance with the wavelengths. Thus, an optical signal having a target wavelength can be readily divided from among optical signals of different wavelengths that are multiplexed.

[b] Second Embodiment

According to the first embodiment, an example of dividing in accordance with the wavelengths the optical signals multiplexed on the first and second optical signals whose directions of the planes of polarization are adjusted has been explained. However, the first and second optical signals whose directions of the planes of polarization are adjusted may be subjected to polarization multiplexing, and the optical signals multiplexed on the first and second optical signals that are subjected to the polarization multiplexing may be divided in accordance with the wavelengths. Thus, according to the second embodiment, an example of subjecting the first and second optical signals with the adjusted directions of the planes of polarization to the polarization multiplexing, and separating in accordance with wavelengths the optical signals multiplexed on the polarization-multiplexed first and second optical signals is explained.

Figure 8:
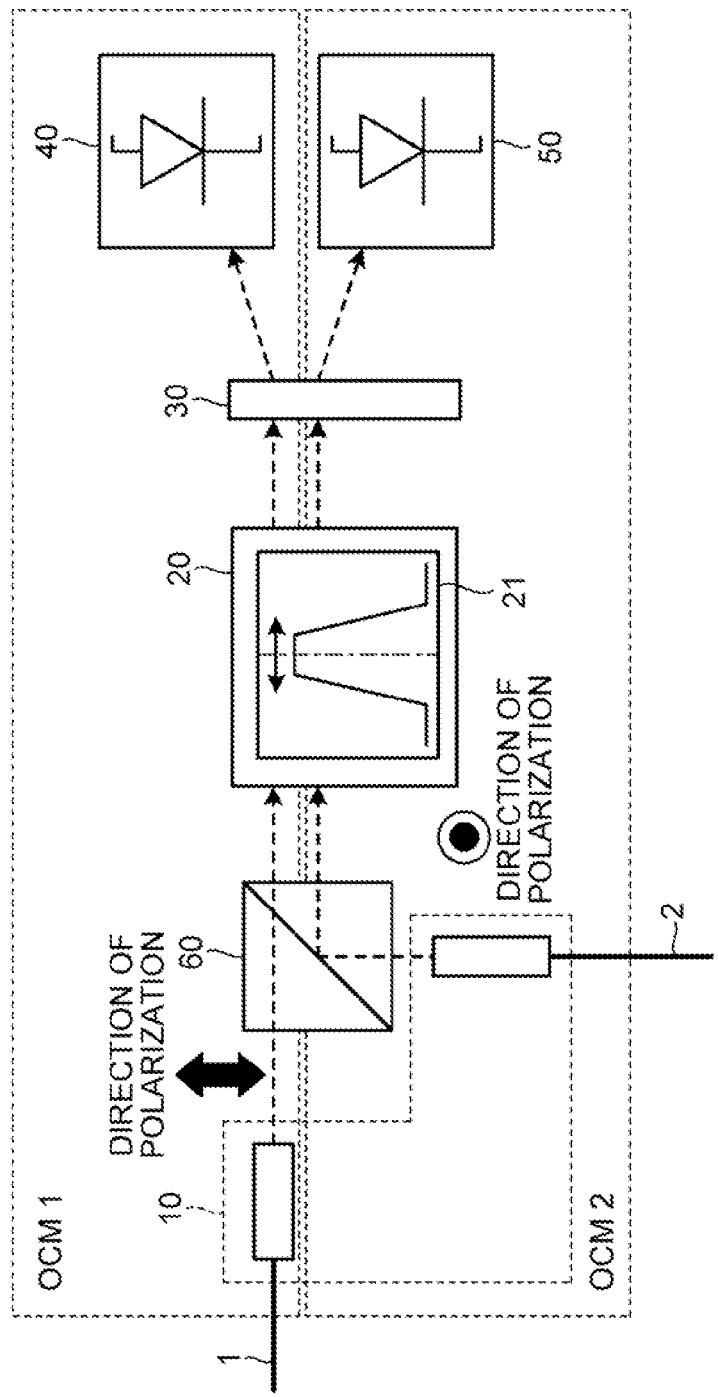
FIG. 8 is a diagram for explaining the structure of the OCM according to the second embodiment.

First, the structure of the OCM according to the second embodiment is explained. FIG. 8 is a diagram for explaining the structure of the OCM according to the second embodiment. In the following explanation, the same reference numerals are given to the same components that have been explained before, and the explanation of any overlapping portion may be omitted. The OCM indicated in FIG. 8 is different from the OCM of FIG. 3 in that a polarization multiplexing signal generating unit 60 is arranged between the first optical system 10 and the wavelength dividing unit 20. The polarization multiplexing signal generating unit 60 can be reworded as a polarization multiplexing signal generator 60.

The polarization multiplexing signal generating unit 60 performs polarization multiplexing onto the first and second optical signals that have the directions of the planes of polarization adjusted by the first optical system 10, and thereby generates a polarization multiplexing signal that includes the first and second optical signals. More specifically, the polarization multiplexing signal generating unit 60 includes a polarization beam splitter in which a dielectric multilayer that reflects an optical signal or allows it to pass in accordance with the direction of the plane of polarization is interposed between two right angle prisms. Then, the polarization multiplexing signal generating unit 60 allows the first optical signal with the direction of polarization adjusted to the first direction to pass and outputs it in the direction toward the wavelength dividing unit 20, while it reflects the second optical signal with the direction of polarization adjusted to the second direction that is orthogonal to the first direction and outputs it in the direction toward the wavelength dividing unit 20.

For example, the polarization multiplexing signal generating unit 60 allows the first optical signal of the OCM 1 having the direction of polarization adjusted to the first direction to pass and outputs it in the direction toward the wavelength dividing unit 20, while it reflects the second optical signal of the OCM 2 having the direction of polarization adjusted to the second direction that is orthogonal to the first direction and outputs it in the direction toward the wavelength dividing unit 20. In this manner, the polarization multiplexing signal generating unit 60 matches the optical paths of the first and second optical signals whose directions of polarization are orthogonal to each other with the direction toward the wavelength dividing unit 20, and generates a polarization multiplexing signal that includes the first and second optical signals.

In addition, the wavelength dividing unit 20 divides the optical signals multiplexed on the first and second optical signals that are included in the polarization multiplexing signal generated by the polarization multiplexing signal generating unit 60, in accordance with the wavelengths. More specifically, the wavelength dividing unit 20 divides, by use of the wavelength tunable filter 21, each of the optical signals multiplexed on the first optical signal input through the input port 1 of the OCM 1 and the second optical signal input through the input port 2 of the OCM 2, which are both included in the polarization multiplexing signal, in accordance with the wavelengths.

Figure 9:
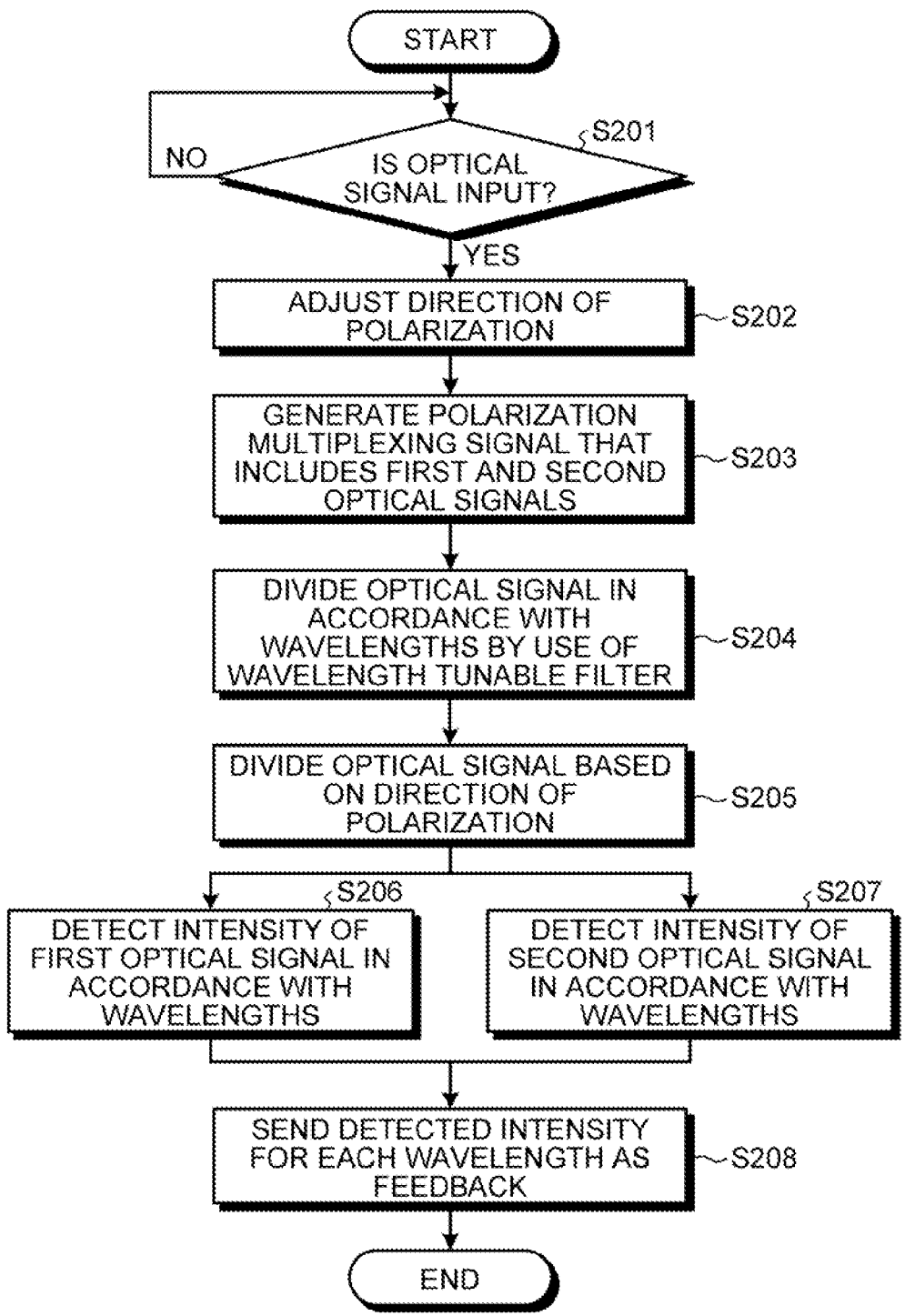
FIG. 9 is a flowchart for illustrating the procedure of a process performed by the OCM according to the second embodiment.

Next, the procedure of the process performed by the OCM according to the second embodiment is explained. FIG. 9 is a flowchart of the procedure of the process performed by the OCM according to the second embodiment. As indicated in FIG. 9, the OCM according to the second embodiment waits until an optical signal is input through an input port (no at step S201).

When an optical signal is input through an input port (yes at step S201), the first optical system 10 of the OCM adjusts the direction of polarization of the input optical signal (step S202). More specifically, the first optical system 10 adjusts the direction of polarization of the first optical signal input through the input port 1 of the OCM 1 to the first direction, and the direction of polarization of the second optical signal input through the input port 2 of the OCM 2 to the second direction that is orthogonal to the first direction.

Then, the polarization multiplexing signal generating unit 60 performs polarization multiplexing onto the first and second optical signals whose directions of the planes of polarization are adjusted by the first optical system 10 and generates a polarization multiplexing signal including the first and second optical signals (step S203). More specifically, the polarization multiplexing signal generating unit 60 is provided with a polarization beam splitter in which a dielectric multilayer that reflects an optical signal or allows it to pass in accordance with the direction of the plane of polarization is interposed between two right angle prisms. Then, the polarization multiplexing signal generating unit 60 allows the first optical signal whose direction of polarization is adjusted to the first direction to pass through and outputs it in the direction toward the wavelength dividing unit 20, and reflects the second optical signal whose direction of polarization is adjusted to the second direction that is orthogonal to the first direction and outputs it to the direction toward the wavelength dividing unit 20.

Then, the wavelength dividing unit 20 divides the optical signals that are multiplexed on the first and second optical signals that are included in the polarization multiplexing signal generated by the polarization multiplexing signal generating unit 60, in accordance with the wavelengths (step S204). More specifically, the wavelength dividing unit 20 uses the wavelength tunable filter 21 and divides, in accordance with wavelengths, the optical signals multiplexed on the first optical signal that is input through the input port 1 of the OCM 1 and the second optical signal that is input through the input port 2 of the OCM 2, which are both included in the polarization multiplexing signal. The following operations at steps S205 to S208 are the same as steps S104 to S107 of FIG. 7, and therefore the explanation thereof is omitted.

As discussed above, according to the second embodiment, the polarization multiplexing signal generating unit 60 performs polarization multiplexing onto the first and second optical signals whose directions of the planes of polarization are adjusted by the first optical system 10, and thereby generates a polarization multiplexing signal that includes the first and second optical signals. Then, the wavelength dividing unit 20 divides each of the optical signals that are multiplexed on the first and second optical signals included in the polarization multiplexing signal that is generated by the polarization multiplexing signal generating unit 60, in accordance with the wavelengths. For this reason, the wavelength separation can be conducted while the optical paths of the optical signals whose directions of polarization are orthogonal to each other are brought into agreement with the direction toward the wavelength dividing unit 20, and thus the space occupied by the wavelength dividing unit 20 can be reduced. As a result, the apparatus having multiple OCMs can be further downsized.

[c] Third Embodiment

In the example of the first embodiment, a polarization beam splitter that includes the birefringent crystals is employed to divide the received optical signal based on the direction of the plane of polarization. However, a polarization beam splitter having a dielectric multilayer that reflects the optical signal or allows it to pass through in accordance with the direction of the plane of polarization may be used to divide the received optical signal based on the direction of the plane of polarization. According to the third embodiment, an example of dividing a received optical signal based on the direction of the plane of polarization by use of a polarization beam splitter having a dielectric multilayer that reflects an optical signal or allows it to pass through in accordance with the direction of the plane of polarization is explained.

Figure 10:
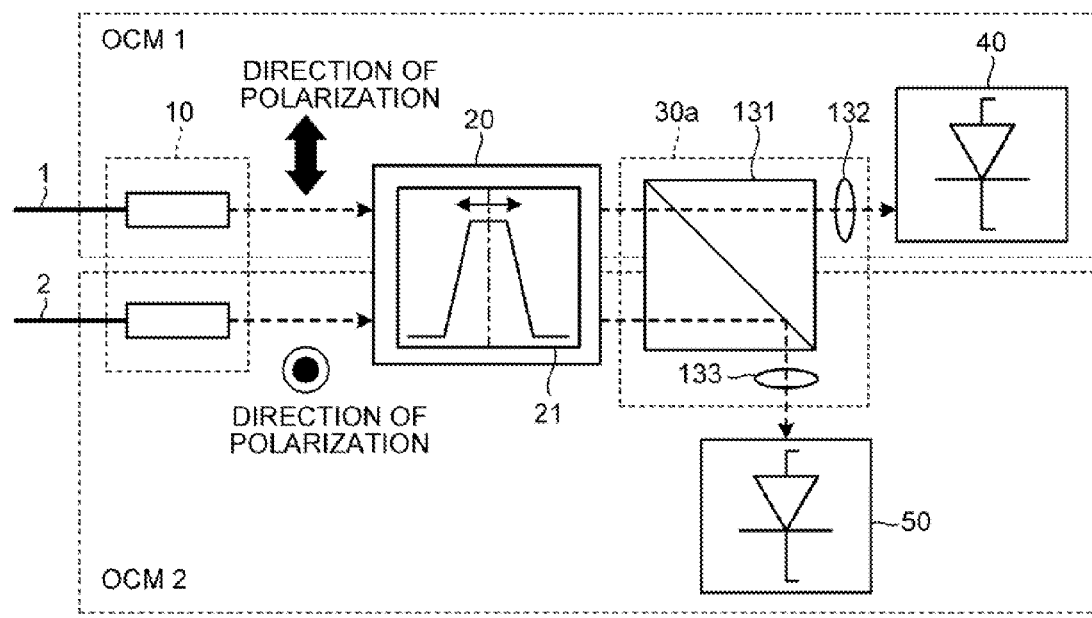
FIG. 10 is a diagram for explaining the structure of the OCM according to the third embodiment.

FIG. 10 is a diagram for explaining the structure of the OCM according to the third embodiment. In the following explanation, the same reference numerals are given to the same components that have been explained before, and the explanation of any overlapping portion may be omitted. The OCM indicated in FIG. 10 is different from the OCM of FIG. 3 in that a second optical system 30a is included in place of the second optical system 30.

The second optical system 30a divides the optical signals that have been divided by the wavelength dividing unit 20 in accordance with the wavelengths, into different directions based on the direction of the plane of polarization. More specifically, the second optical system 30a includes a polarization beam splitter 131 in which a dielectric multilayer that reflects an optical signal or allows it to pass through in accordance with the direction of the plane of polarization is arranged between two right angle prisms. Then, the second optical system 30a allows the received optical signal whose direction of polarization is the first direction to pass and outputs it in a direction toward the first intensity detecting unit 40, while it reflects the received optical signal whose direction of polarization is the second direction that is orthogonal to the first direction and outputs it in the direction toward the second intensity detecting unit 50. Then, the second optical system 30a collects the optical signals divided in the directions of the first intensity detecting unit 40 and of the second intensity detecting unit 50 by use of a lens 132 and a lens 133, respectively, that are arranged downstream of the polarization beam splitter 131.

For example, the second optical system 30a outputs the optical signal of the OCM 1 whose direction of polarization is vertical to the ground in a direction toward the first intensity detecting unit 40, and the optical signal of the OCM 2 whose direction of polarization is parallel to the ground in a direction toward the second intensity detecting unit 50. Furthermore, the second optical system 30a collects the optical signal of the OCM 1 output in the direction toward the first intensity detecting unit 40 and the optical signal of the OCM 2 output in the direction toward the second intensity detecting unit 50, and thereby divides the optical signal of the OCM 1 and the optical signal of the OCM 2 in directions separating from each other. The procedure of the process performed by the OCM according to the third embodiment is the same as the procedure of the process performed by the OCM according to the first embodiment, and therefore the explanation thereof is omitted here.

As described above, according to the third embodiment, the second optical system 30a uses the polarization beam splitter having a dielectric multilayer that reflects an optical signal or allows it to pass through in accordance with the direction of the plane of polarization to divide the received optical signal into different directions in accordance with the direction of the plane of polarization. In this manner, two optical signals whose directions of the planes of polarization are orthogonal to each other can be readily divided in directions separating from each others, and crosstalk can be effectively prevented from occurring. Furthermore, a polarization beam splitter having a dielectric multilayer is often less expensive than a polarization beam splitter having a birefringent crystal, and because crosstalk can be avoided without using a polarization beam splitter that includes a birefringent crystal, costs can be reduced.

[d] Fourth Embodiment

According to the second embodiment, an example of dividing a received optical signal based on the direction of the plane of polarization by use of a polarization beam splitter having a birefringent crystal has been explained. However, a polarization beam splitter provided with a dielectric multilayer that reflects an optical signal or allows it to pass through in accordance with the direction of the plane of polarization may be adopted to divide the received optical signal based on the direction of the plane of polarization. According to the fourth embodiment, an example of dividing an optical signal based on the direction of the plane of polarization by use of a polarization beam splitter provided with a dielectric multilayer that reflects an optical signal or allows it to pass through in accordance with the direction of the plane of polarization is explained.

Figure 11:
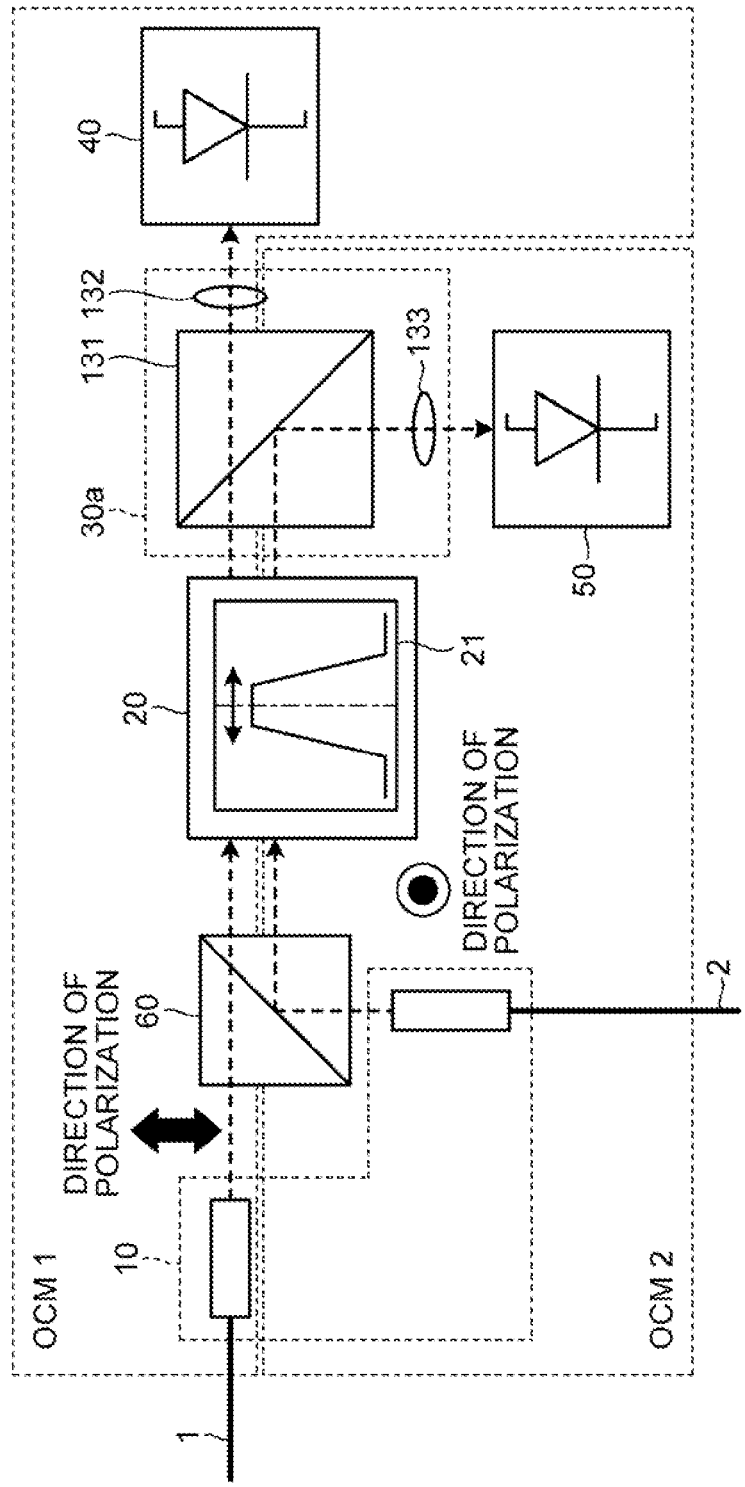
FIG. 11 is a diagram for explaining the structure of the OCM according to the fourth embodiment.

FIG. 11 is a diagram for explaining the structure of the OCM according to the fourth embodiment. In the following explanation, the same reference numerals are given to the same components that have been explained before, and the explanation of any overlapping portion may be omitted. The OCM indicated in FIG. 11 is different from the OCM of FIG. 8 in that the second optical system 30a is included in place of the second optical system 30. The second optical system 30a is the same as that of the third embodiment, and thus the explanation thereof is omitted here. In addition, the procedure of the process performed by the OCM according to the fourth embodiment is the same as the procedure of the process performed by the OCM according to the second embodiment, and thus the explanation thereof is omitted here.

As mentioned above, according to the fourth embodiment, the second optical system 30a divides a received optical signal into different directions based on the direction of the plane of polarization by use of a polarization beam splitter having a dielectric multilayer that reflects an optical signal or allows it to pass through in accordance with the direction of the plane of polarization. For this reason, the two optical signals whose directions of the planes of polarization are orthogonal to each other can be easily divided in directions separating from each other, and crosstalk can be effectively avoided. Furthermore, a polarization beam splitter that includes a dielectric multilayer is often less expensive than a polarization beam splitter that includes a birefringent crystal. Crosstalk therefore can be avoided without using a polarization beam splitter that includes a birefringent crystal, which can reduce costs.

[e] Fifth embodiment

According to the first embodiment, an example of dividing optical signals multiplexed on the first and second optical signals by use of the wavelength tunable filter has been explained. However, a diffraction grating may be used to divide optical signals multiplexed on the first and second optical signals in accordance with wavelengths. Thus, according to the fifth embodiment, an example of dividing optical signals multiplexed on the first and second optical signals by use of a diffraction grating is explained.

Figure 12:
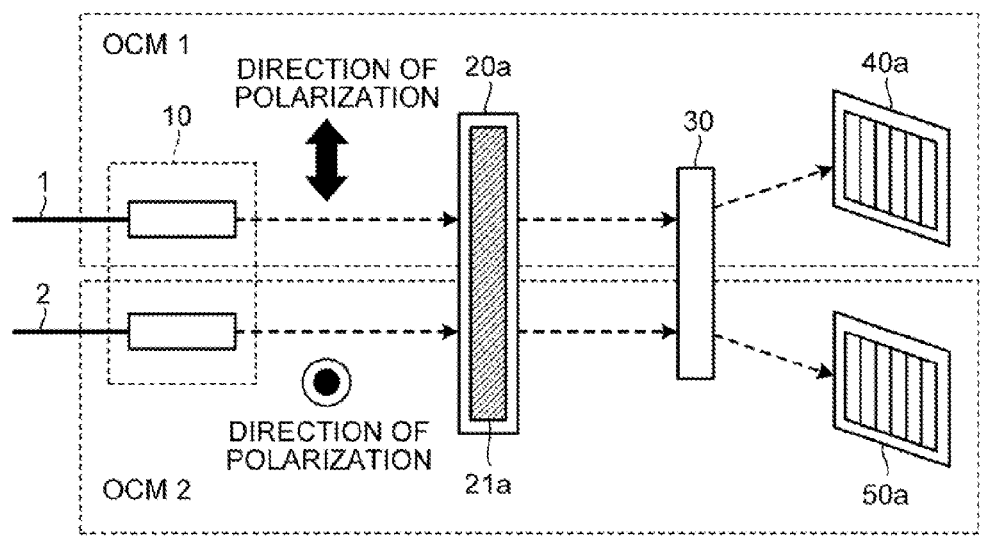
FIG. 12 is a diagram for explaining the structure of the OCM according to the fifth embodiment.

First, the structure of the OCM according to the fifth embodiment is explained. FIG. 12 is a diagram for explaining the structure of the OCM according to the fifth embodiment. In the following explanation, the same reference numerals are given to the same components that have been explained before, and the explanation of any overlapping portion may be omitted. The OCM indicated in FIG. 12 is different from the OCM of FIG. 3 in that a wavelength dividing unit 20a, a first intensity detecting unit 40a, and a second intensity detecting unit 50a are included in place of the wavelength dividing unit 20, the first intensity detecting unit 40, and the second intensity detecting unit 50.

The wavelength dividing unit 20a divides each of the optical signals multiplexed on the first and second optical signals having the directions of the planes of polarization are adjusted by the first optical system 10, in accordance with wavelengths. More specifically, the wavelength dividing unit 20a is provided with a diffraction grating 21a that splits the received optical signal to different directions in accordance with the wavelengths, and divides the optical signals multiplexed on the first and second optical signals whose directions of the planes of polarization are adjusted by the first optical system 10, in accordance with the wavelengths.

For example, if the wavelength dividing unit 20a is provided with the diffraction grating 21a, which is a transmissive diffraction grating, the first optical signal that has the direction of polarization adjusted after being input through the input port 1 of the OCM 1 is allowed to pass through the diffraction grating 21a, and the wavelength dividing unit 20a thereby divides the first optical signal in accordance with wavelengths. Furthermore, the wavelength dividing unit 20a allows the second optical signal that has the direction of polarization adjusted after being input through the input port 2 of the OCM 2 to pass through the diffraction grating 21a, and thereby divides the second optical signal in accordance with the wavelengths.

For example, if the wavelength dividing unit 20a is provided with the diffraction grating 21a that is a reflective diffraction grating, it reflexes onto the diffraction grating 21a the first optical signal that has the direction of polarization adjusted after being input through the input port 1 of the OCM 1, and thereby divides the first optical signal in accordance with the wavelengths. In addition, the wavelength dividing unit 20a reflexes onto the diffraction grating 21a the second optical signal that has the direction of polarization adjusted after being input through the input port 2 of the OCM 2, and thereby divides the second optical signal in accordance with the wavelengths.

The first intensity detecting unit 40a receives an optical signal whose direction of the plane of polarization is the first direction from among the optical signals divided by the second optical system 30, and detects the intensity of the first optical signal for each of the wavelengths. For example, the first intensity detecting unit 40a has a PD array in which multiple PDs are aligned. It receives the optical signal of the OCM 1 that is upwardly output by the second optical system 30 and has the direction of polarization that is vertical to the ground, and detects the intensity of the first optical signal input through the input port 1 of the OCM 1, in accordance with the wavelengths.

The second intensity detecting unit 50a receives an optical signal whose direction of the plane of polarization is the second direction from among the optical signals divided by the second optical system 30, and detects the intensity of the second optical signal. For example, the second intensity detecting unit 50a includes a PD array in which multiple PDs are aligned. It receives an optical signal of the OCM 2 that is downwardly output by the second optical system 30 and has the direction of polarization parallel to the ground, and detects the intensity of the second optical signal input through the input port 2 of the OCM 2, in accordance with the wavelengths.

Figure 13:
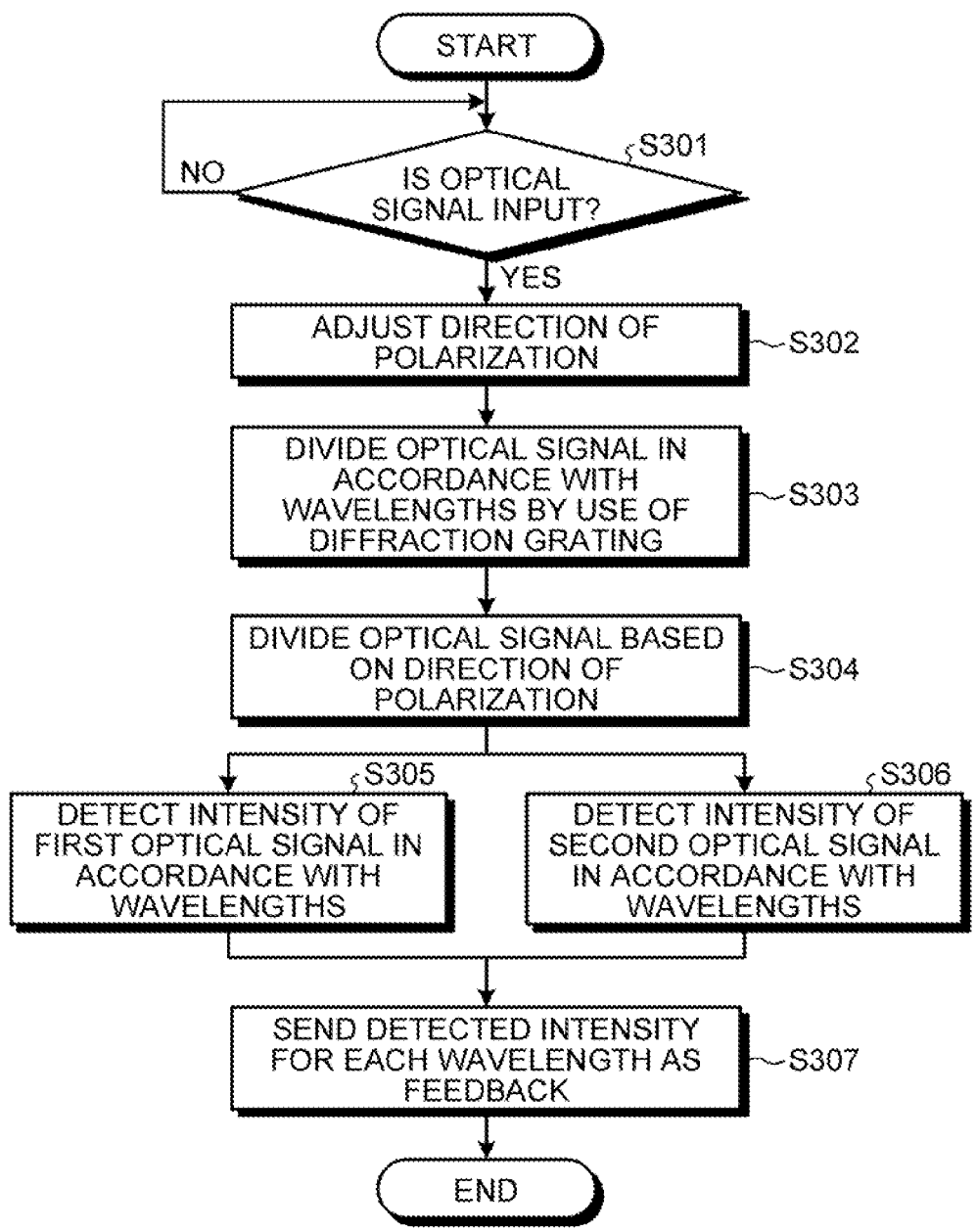
FIG. 13 is a flowchart for illustrating the procedure of a process performed by the OCM according to the fifth embodiment.

Next, the procedure of the process performed by the OCM according to the fifth embodiment is explained. FIG. 13 is a flowchart of the procedure of the process performed by the OCM according to the fifth embodiment. As indicated in FIG. 13, the OCM according to the fifth embodiment waits until an optical signal is input through an input port (no at step S301).

When an optical signal is input through an input port (yes at step S301), the first optical system 10 of the OCM adjusts the direction of polarization of the input optical signal (step S302). More specifically, the first optical system 10 adjusts the direction of polarization of the first optical signal input through the input port 1 of the OCM 1 to the first direction, and the direction of polarization of the second optical signal input through the input port 2 of the OCM 2 to the second direction that is orthogonal to the first direction.

Then, the wavelength dividing unit 20a divides the optical signals multiplexed on the first and second optical signals whose directions of polarization are adjusted by the first optical system 10, in accordance with the wavelengths (step S303). More specifically, the wavelength dividing unit 20a divides, by use of the diffraction grating 21a, each of the optical signals that are multiplexed on the first optical signal input through the input port 1 of the OCM 1 and the second optical signal input through the input port 2 of the OCM 2, in accordance with the wavelengths.

Then, the second optical system 30 divides each of the optical signals divided in accordance with the wavelengths by the wavelength dividing unit 20a, into different directions based on the direction of polarization (step S304). More specifically, the second optical system 30 divides the first optical signal whose direction of polarization is adjusted to the first direction and the second optical signal whose direction of polarization is adjusted to the second direction that is orthogonal to the first direction into different travelling directions.

Then, the first intensity detecting unit 40a receives, among the optical signals divided by the wavelength dividing unit 20a in accordance with the wavelengths and further divided by the second optical system 30 in accordance with the directions of polarization, an optical signal whose direction of polarization is the first direction, and detects the intensity of the first optical signal in accordance with the wavelengths (step S305). For example, the first intensity detecting unit 40a receives, by use of a PD array, the optical signal of the OCM 1 that is output by the second optical system 30 in a direction separating from the OCM 2 and has the direction of polarization vertical to the ground, and detects the intensity of the first optical signal input through the input port 1 of the OCM 1, in accordance with the wavelengths.

On the other hand, the second intensity detecting unit 50a receives an optical signal whose direction of polarization is the second direction from among the optical signals that are divided by the wavelength dividing unit 20a in accordance with wavelengths and further divided by the second optical system 30 in accordance with the direction of polarization, and detects the intensity of the second optical signal in accordance with the wavelengths (step S306). For example, the second intensity detecting unit 50a receives, by use of the PD array, an optical signal of the OCM 2 that is output by the second optical system 30 in a direction separating from the OCM 1 and has the direction of polarization parallel to the ground, and detects the intensity of the second optical signal input through the input port 2 of the OCM 2 in accordance with the wavelengths.

Thereafter, the first intensity detecting unit 40a and the second intensity detecting unit 50a supply as feedback the detected intensities of the optical signals for the wavelengths to the WSS controlling circuit that controls a WSS (step S307), and the process is terminated.

As discussed above, according to the fifth embodiment, the wavelength dividing unit 20a divides the optical signals multiplexed on the first and second optical signals in accordance with wavelengths by use of the diffraction grating 21a. Thus, all the optical signals of different wavelengths that are multiplexed on the multiple wavelength light can be divided at a time, and the wavelength separation can be performed faster than the wavelength separation that adopts a wavelength tunable filter for changing transmissive wavelengths at regular intervals.

[f] Sixth Embodiment

According to the fifth embodiment, an example of dividing in accordance with the wavelengths the optical signals that are multiplexed on the first and second optical signals having their directions of the planes of polarization adjusted has been explained. However, polarization multiplexing may be performed onto the first and second optical signals having their directions of the planes of polarization adjusted, and the optical signals multiplexed on the polarization-multiplexed first and second optical signals may be divided in accordance with the wavelengths. According to the sixth embodiment, an example of performing polarization multiplexing onto the first and second optical signals having their directions of the planes of polarization adjusted and dividing the optical signals multiplexed on the polarization-multiplexed first and second optical signals in accordance with wavelengths is explained.

Figure 14:
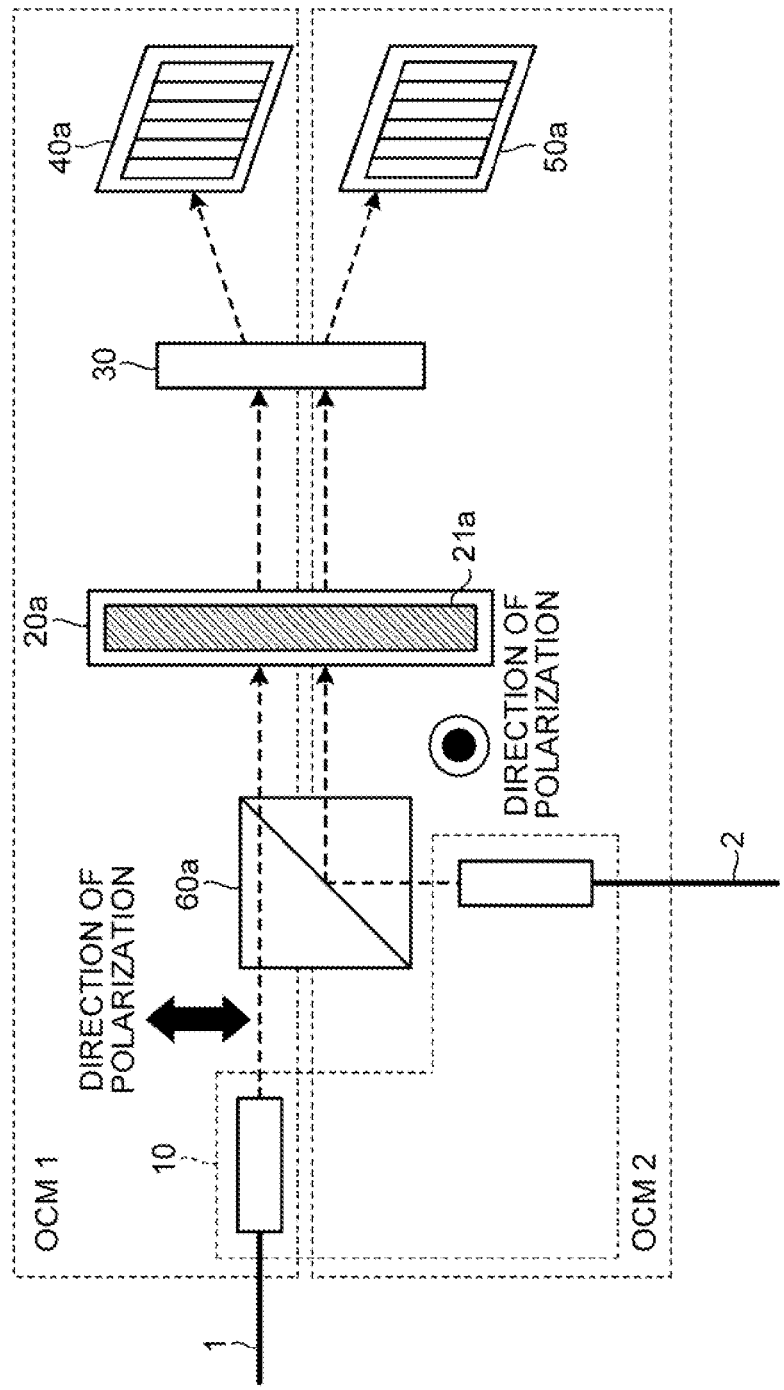
FIG. 14 is a diagram for explaining the structure of the OCM according to the sixth embodiment.

First, the structure of the OCM according to the sixth embodiment is explained. FIG. 14 is a diagram for explaining the structure of the OCM according to the sixth embodiment. In the following explanation, the same reference numerals are given to the same components that have been explained before, and the explanation of any overlapping portion may be omitted. The OCM illustrated in FIG. 14 is different from the OCM of FIG. 12 in that a polarization multiplexing signal generating unit 60a is included between the first optical system 10 and the wavelength dividing unit 20a.

The polarization multiplexing signal generating unit 60a performs polarization multiplexing onto the first and second optical signals whose directions of the planes of polarization are adjusted by the first optical system 10 to generate a polarization multiplexing signal that includes the first and second optical signals. More specifically, the polarization multiplexing signal generating unit 60a is provided with a polarization beam splitter in which a dielectric multilayer is interposed between two right angle prisms to reflect an optical signal or allows it to pass in accordance with its direction of the plane of polarization. Then, the polarization multiplexing signal generating unit 60a allows the first optical signal whose direction of polarization is adjusted to the first direction to pass through and outputs it in the direction toward the wavelength dividing unit 20a, while it reflects the second optical signal whose direction of polarization is adjusted to the second direction that is orthogonal to the first direction and outputs it in the direction toward the wavelength dividing unit 20a.

For example, the polarization multiplexing signal generating unit 60a allows the first optical signal of the OCM 1 whose direction of polarization is adjusted to the first direction to pass through and outputs it in the direction toward the wavelength dividing unit 20a, while it reflects the second optical signal of the OCM 2 whose direction of polarization is adjusted to the second direction that is orthogonal to the first direction and outputs it in the direction toward the wavelength dividing unit 20a. In this manner, the polarization multiplexing signal generating unit 60a brings the optical paths of both the first and second optical signals whose directions of polarization are orthogonal to each other into agreement with the direction toward the wavelength dividing unit 20a, and generates a polarization multiplexing signal that includes the first and second optical signals.

Moreover, the wavelength dividing unit 20a divides each of the optical signals multiplexed on the first and second optical signals that are included in the polarization multiplexing signal generated by the polarization multiplexing signal generating unit 60a, in accordance with the wavelengths. More specifically, the wavelength dividing unit 20a divides the optical signals multiplexed on the first optical signal input through the input port 1 of the OCM 1 and the second optical signal input through the input port 2 of the OCM 2, which are both included in the polarization multiplexing signal, in accordance with the wavelengths by use of the diffraction grating 21a.

Figure 15:
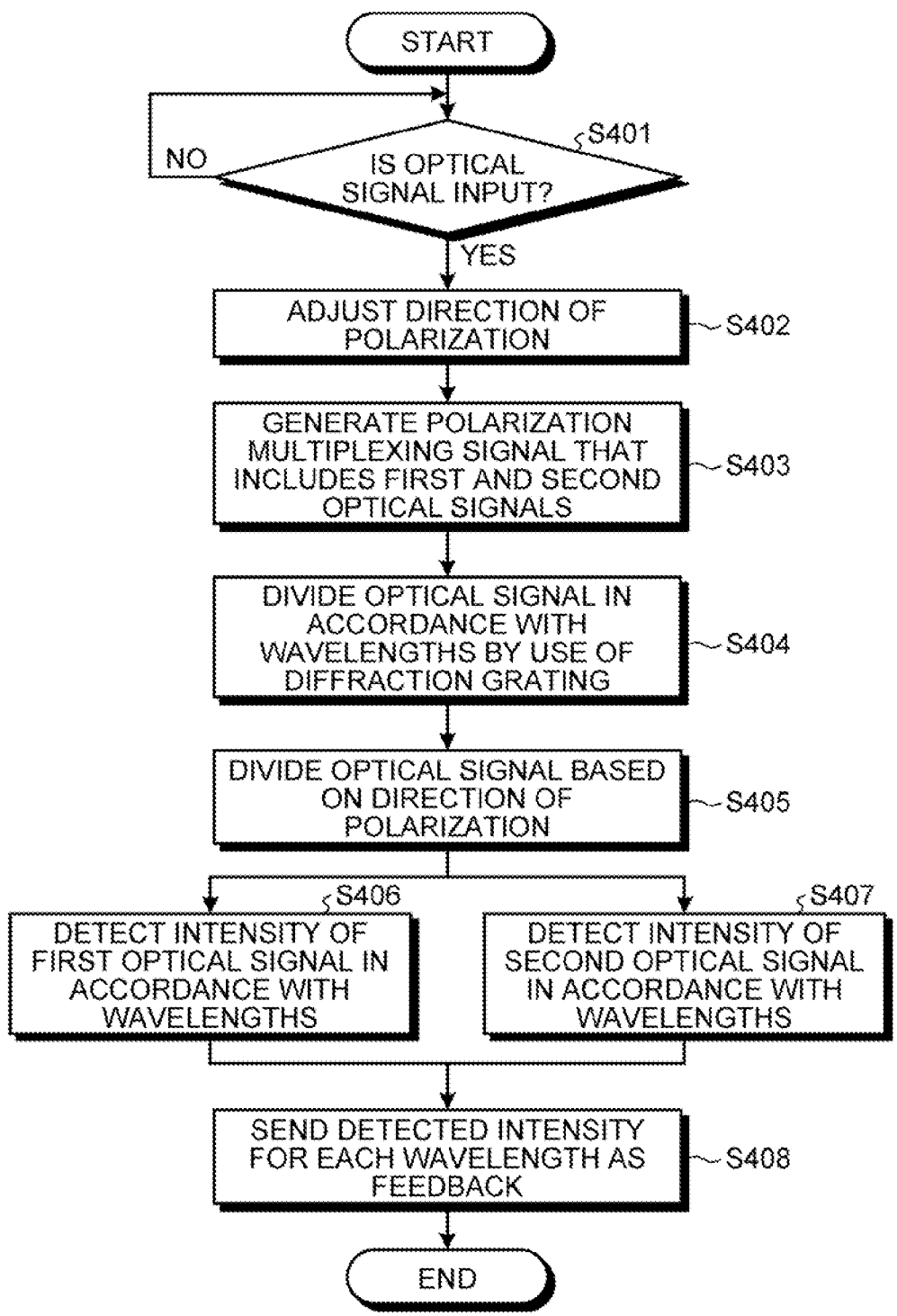
FIG. 15 is a flowchart for illustrating the procedure of a process performed by the OCM according to the sixth embodiment.

Next, the procedure of the process performed by the OCM according to the sixth embodiment is explained. FIG. 15 is a flowchart of the procedure of the process performed by the OCM according to the sixth embodiment. As indicated in FIG. 15, the OCM according to the sixth embodiment waits until an optical signal is input through an input port (no at step S401).

When an optical signal is input through an input port (yes at step S401), the first optical system 10 of the OCM adjusts the direction of polarization of the input optical signal (step S402). More specifically, the first optical system 10 adjusts the direction of polarization of the first optical signal that is input through the input port 1 of the OCM 1 to the first direction, and also adjusts the direction of polarization of the second optical signal that is input through the input port 2 of the OCM 2 to the second direction that is orthogonal to the first direction.

Then, the polarization multiplexing signal generating unit 60a performs polarization multiplexing onto the first and second optical signals whose directions of the planes of polarization are adjusted by the first optical system 10, and generates a polarization multiplexing signal that includes the first and second optical signals (step S403). More specifically, the polarization multiplexing signal generating unit 60a includes a polarization beam splitter in which a dielectric multilayer is interposed between two right angle prisms to reflect an optical signal or allow it to pass through in accordance with the direction of the plane of polarization. Then, the polarization multiplexing signal generating unit 60a allows the first optical signal whose direction of polarization is adjusted to the first direction to pass through and outputs it in the direction toward the wavelength dividing unit 20a, while it reflects the second optical signal whose direction of polarization is adjusted to the second direction orthogonal to the first direction and outputs it in the direction toward the wavelength dividing unit 20a.

Then, the wavelength dividing unit 20a divides the optical signals multiplexed on the first and second optical signals that are included in the polarization multiplexing signal generated by the polarization multiplexing signal generating unit 60a, in accordance with the wavelengths (step S404). More specifically, the wavelength dividing unit 20a divides the optical signals multiplexed on the first optical signal input through the input port 1 of the OCM 1 and the second optical signal input through the input port 2 of the OCM 2, which are both included in the polarization multiplexing signal, in accordance with the wavelengths by use of the diffraction grating 21a. The operations at steps S405 through S408 are the same as those at steps S304 through S307 indicated in FIG. 13, and thus the explanation thereof is omitted here.

As discussed above, according to the sixth embodiment, the polarization multiplexing signal generating unit 60a performs polarization multiplexing onto the first and second optical signals whose directions of the planes of polarization are adjusted by the first optical system 10, and thereby generates a polarization multiplexing signal that includes the first and second optical signals. Then, the wavelength dividing unit 20a divides the optical signals multiplexed on the first and second optical signals that are included in the polarization multiplexing signal generated by the polarization multiplexing signal generating unit 60a, in accordance with the wavelengths. Because the optical paths of the optical signals whose directions of polarization are orthogonal to each other are both brought into agreement with the direction toward the wavelength dividing unit 20a before the wavelength separation is performed, the space occupied by the wavelength dividing unit 20a can be reduced. As a result, the apparatus having multiple OCMs can be further downsized.

[g] Seventh Embodiment

According to the fifth embodiment, an example of dividing a received optical signal based on its direction of the plane of polarization by use of the polarization beam splitter having birefringent crystal has been explained. However, a polarization beam splitter having a dielectric multilayer that reflects an optical signal or allows it to pass through in accordance with its direction of the plane of polarization may be adopted to divide the received optical signal based on its direction of the plane of polarization. Thus, according to the seventh embodiment, an example of dividing the received optical signal based on the direction of the plane of polarization by use of a polarization beam splitter having a dielectric multilayer that reflects an optical signal or allows it to pass through in accordance with the direction of the plane of polarization is explained.

Figure 16:
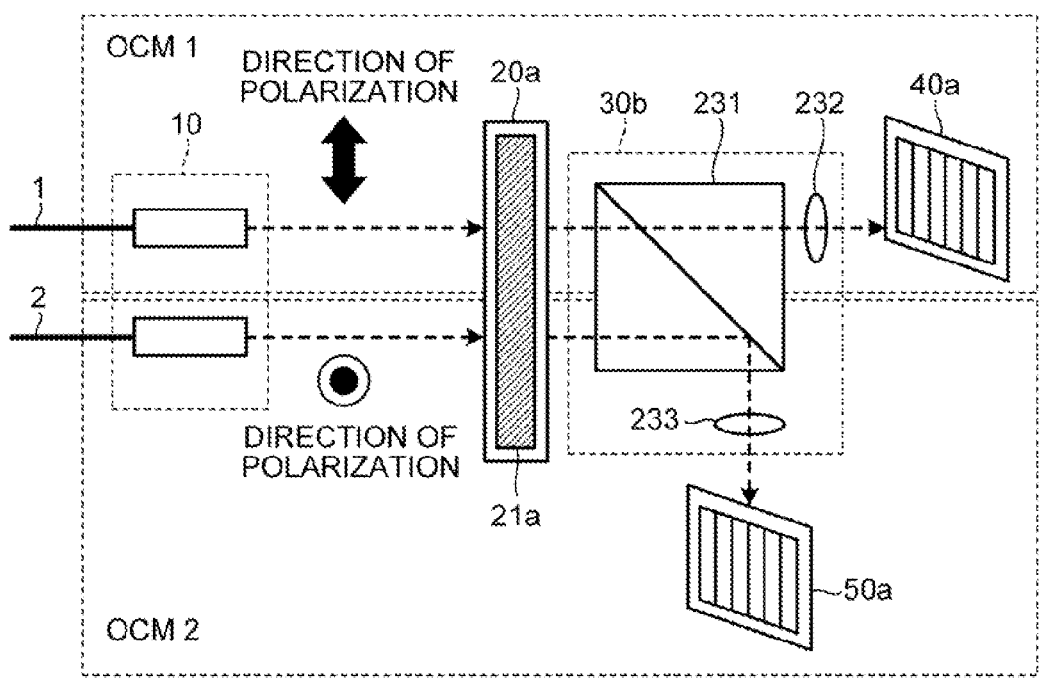
FIG. 16 is a diagram for explaining the structure of the OCM according to the seventh embodiment.

FIG. 16 is a diagram for explaining the structure of the OCM according to the seventh embodiment. In the following explanation, the same reference numerals are given to the same components that have been explained before, and the explanation of any overlapping portion may be omitted. The OCM indicated in FIG. 16 is different from the OCM of FIG. 12 in that a second optical system 30b is included in place of the second optical system 30.

The second optical system 30b divides the optical signals that have been divided by the wavelength dividing unit 20a in accordance with the wavelengths, into different directions based on the direction of the plane of polarization. More specifically, the second optical system 30b includes a polarization beam splitter 231 in which a dielectric multilayer is interposed between two right angle prisms to reflect an optical signal or allow it to pass through in accordance with its direction of the plane of polarization. Then, the second optical system 30b allows the received optical signal whose direction of polarization is the first direction to pass and outputs it in the direction toward the first intensity detecting unit 40a, while it reflects the received optical signal whose direction of polarization is the second direction that is orthogonal to the first direction and outputs it in the direction toward the second intensity detecting unit 50a. Then, the second optical system 30b collects the optical signals divided in the directions toward the first intensity detecting unit 40a and the second intensity detecting unit 50a, by use of a lens 232 and a lens 233, respectively, arranged downstream of the polarization beam splitter 231.

For example, the second optical system 30b outputs the optical signal of the OCM 1 whose direction of polarization is vertical to the ground in the direction toward the first intensity detecting unit 40a, and outputs the optical signal of the OCM 2 whose direction of polarization is parallel to the ground in the direction toward the second intensity detecting unit 50a. Furthermore, the second optical system 30b collects the optical signal of the OCM 1 that is output in the direction toward the first intensity detecting unit 40a and also the optical signal of the OCM 2 that is output in the direction toward the second intensity detecting unit 50a so that the optical signal of the OCM 1 and the optical signal of the OCM 2 can be divided in directions separating from each other. The procedure of the process performed by the OCM according to the seventh embodiment is the same as the procedure of the process performed by the OCM according to the fifth embodiment, and thus the explanation thereof is omitted here.

As described above, according to the seventh embodiment, the second optical system 30b uses a polarization beam splitter provided with a dielectric multilayer that reflects an optical signal or allows it to pass through in accordance with its direction of the plane of polarization and thereby divides the received optical signal into different directions based on the direction of the plane of polarization. For this reason, two optical signals whose directions of the planes of polarization are orthogonal to each other can be easily divided in directions separating from each other, and crosstalk can be effectively avoided. Furthermore, a polarization beam splitter that includes a dielectric multilayer is generally less expensive that a polarization beam splitter that includes birefringent crystal. Because crosstalk can be avoided without using a polarization beam splitter that includes birefringent crystal, costs can be reduced.

[h] Eighth Embodiment

According to the sixth embodiment, an example of dividing a received optical signal based on its direction of the plane of polarization by use of a polarization beam splitter including birefringent crystal has been explained. However, a polarization beam splitter having a dielectric multilayer that reflects an optical signal or allows it to pass through in accordance with its direction of the plane of polarization may be used to divide the received optical signal based its direction of the plane of polarization. According to the eighth embodiment, an example of dividing the received optical signal based on its direction of the plane of polarization by use of a polarization beam splitter having a dielectric multilayer that reflects an optical signal or allows it to pass through in accordance with its direction of the plane of polarization is explained.

Figure 17:
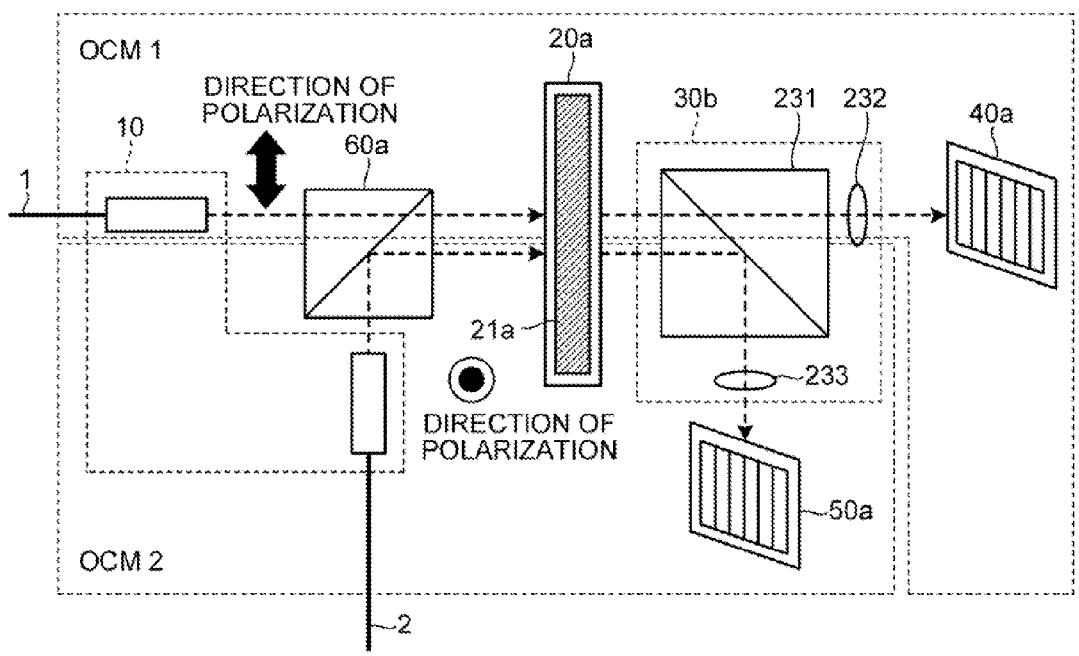
FIG. 17 is a diagram for explaining the structure of the OCM according to the eighth embodiment.

FIG. 17 is a diagram for explaining the structure of the OCM according to the eighth embodiment. In the following explanation, the same reference numerals are given to the same components that have been explained before, and the explanation of any overlapping portion may be omitted. The OCM illustrated in FIG. 17 is different from the OCM of FIG. 14 in that a second optical system 30b is included in place of the second optical system 30. The second optical system 30b is the same as that of the seventh embodiment, and thus the explanation thereof is omitted here. Furthermore, the procedure of the process performed by the OCM according to the eighth embodiment is the same as the procedure of the process performed by the OCM according to the sixth embodiment, and thus the explanation thereof is omitted here.

As described above, according to the eighth embodiment, the second optical system 30b divides a received optical signal into different directions based on the direction of the plane of polarization by use of a polarization beam splitter having a dielectric multilayer that reflects an optical signal or allows it to pass through in accordance with its direction of the plane of polarization. For this reason, the two optical signals whose directions of the planes of polarization are orthogonal to each other can be easily divided in directions separating from each other, and crosstalk can be effectively avoided. Furthermore, a polarization beam splitter that includes a dielectric multilayer is generally less expensive that a polarization beam splitter that includes birefringent crystal, and because crosstalk can be avoided without using a polarization beam splitter including birefringent crystal, costs can be reduced.

[i] Ninth Embodiment

According to the first embodiment, an example of dividing each of the optical signals multiplexed on the first and second optical signals in accordance with the wavelengths by use of a wavelength tunable filter has been explained. However, a diffraction grating and a MEMS mirror may be adopted to divide the optical signals multiplexed on the first and second optical signals in accordance with the wavelengths. According to the ninth embodiment, an example of dividing the optical signals multiplexed on the first and second optical signals in accordance with the wavelengths by use of a diffraction grating and a MEMS mirror is explained.

Figure 18:
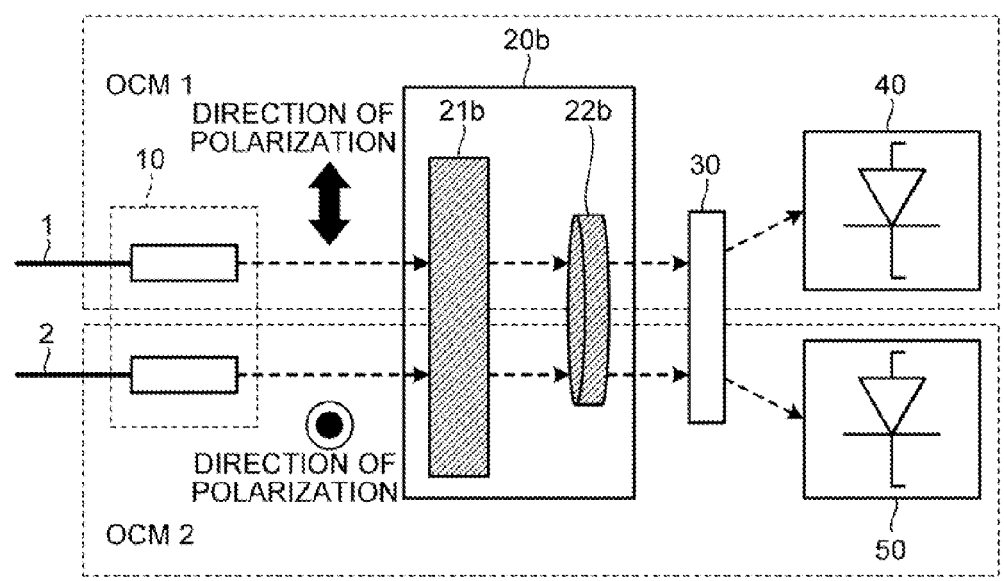
FIG. 18 is a diagram for explaining the structure of the OCM according to the ninth embodiment.

First, the structure of the OCM according to the ninth embodiment is explained. FIG. 18 is a diagram for explaining the structure of the OCM according to the ninth embodiment. In the following explanation, the same reference numerals are given to the same components that have been explained before, and the explanation of any overlapping portion may be omitted. The OCM illustrated in FIG. 18 is different from the OCM of FIG. 3 in that a wavelength dividing unit 20b is included in place of the wavelength dividing unit 20.

The wavelength dividing unit 20b divides each of the optical signals multiplexed on the first and second optical signals whose directions of the planes of polarization are adjusted by the first optical system 10, in accordance with the wavelengths. More specifically, the wavelength dividing unit 20b includes a diffraction grating 21b that splits the received optical signal into different directions in accordance with the wavelengths and a MEMS mirror 22b that reflects to the downstream side an optical signal of a specific wavelength among the optical signals that are split by the diffraction grating 21b in accordance with the wavelengths. Then, the wavelength dividing unit 20b divides the optical signals multiplexed the first and second optical signals whose directions of the planes of polarization are adjusted by the first optical system 10, in accordance with the wavelengths by use of the diffraction grating 21b and the MEMS mirror 22b.

For example, if the diffraction grating 21b is a transmissive diffraction grating, the wavelength dividing unit 20b allows the first optical signal whose direction of polarization is adjusted after being input through the input port 1 of the OCM 1 to pass through the diffraction grating 21b so that the first optical signal can be split into different directions in accordance with the wavelengths. Then, the wavelength dividing unit 20b controls the angle of the MEMS mirror 22b to reflect an optical signal of a specific wavelength into the direction toward the second optical system 30 among the first optical signals split by the diffraction grating 21b in accordance with the wavelengths, and thereby divides the optical signal multiplexed on the first optical signal in accordance with the wavelengths. In addition, the wavelength dividing unit 20b allows the second optical signal whose direction of polarization is adjusted after being input through the input port 2 of the OCM 2 to pass through the diffraction grating 21b, and thereby splits the second optical signal into different directions in accordance with the wavelengths. Then, the wavelength dividing unit 20b controls the angle of the MEMS mirror 22b to reflect an optical signal of a specific wavelength in the direction toward the second optical system 30 among the second optical signals split by the diffraction grating 21b in accordance with the wavelengths, and thereby divides the optical signal multiplexed on the second optical signal in accordance with the wavelengths.

For example, if the diffraction grating 21b is a reflective diffraction grating, the wavelength dividing unit 20b reflects the first optical signal whose direction of polarization is adjusted after being input through the input port 1 of the OCM 1 onto the diffraction grating 21b, and splits the first optical signal into different directions in accordance with the wavelengths. Then, the wavelength dividing unit 20b controls the angle of the MEMS mirror 22b to reflect an optical signal of a specific wavelength into the direction toward the second optical system 30 among the first optical signals split by the diffraction grating 21b in accordance with the wavelengths, and thereby divides the optical signals multiplexed on the first optical signal in accordance with the wavelengths. Furthermore, the wavelength dividing unit 20b reflects onto the diffraction grating 21b the second optical signal whose direction of polarization is adjusted after being input through the input port 2 of the OCM 2, and splits the second optical signal into different directions in accordance with the wavelengths. Then, the wavelength dividing unit 20b reflects an optical signal of a specific wavelength in the direction toward the second optical system 30 among the second optical signals split in accordance with the wavelengths by the diffraction grating 21b by controlling the MEMS mirror 22b, and thereby divides the optical signals multiplexed on the second optical signal in accordance with the wavelengths. The MEMS mirror 22b actually reflects the optical signal, but in FIG. 18, the MEMS mirror 22b is illustrated as allowing the optical signal to pass through, for convenience of explanation.

Figure 19:
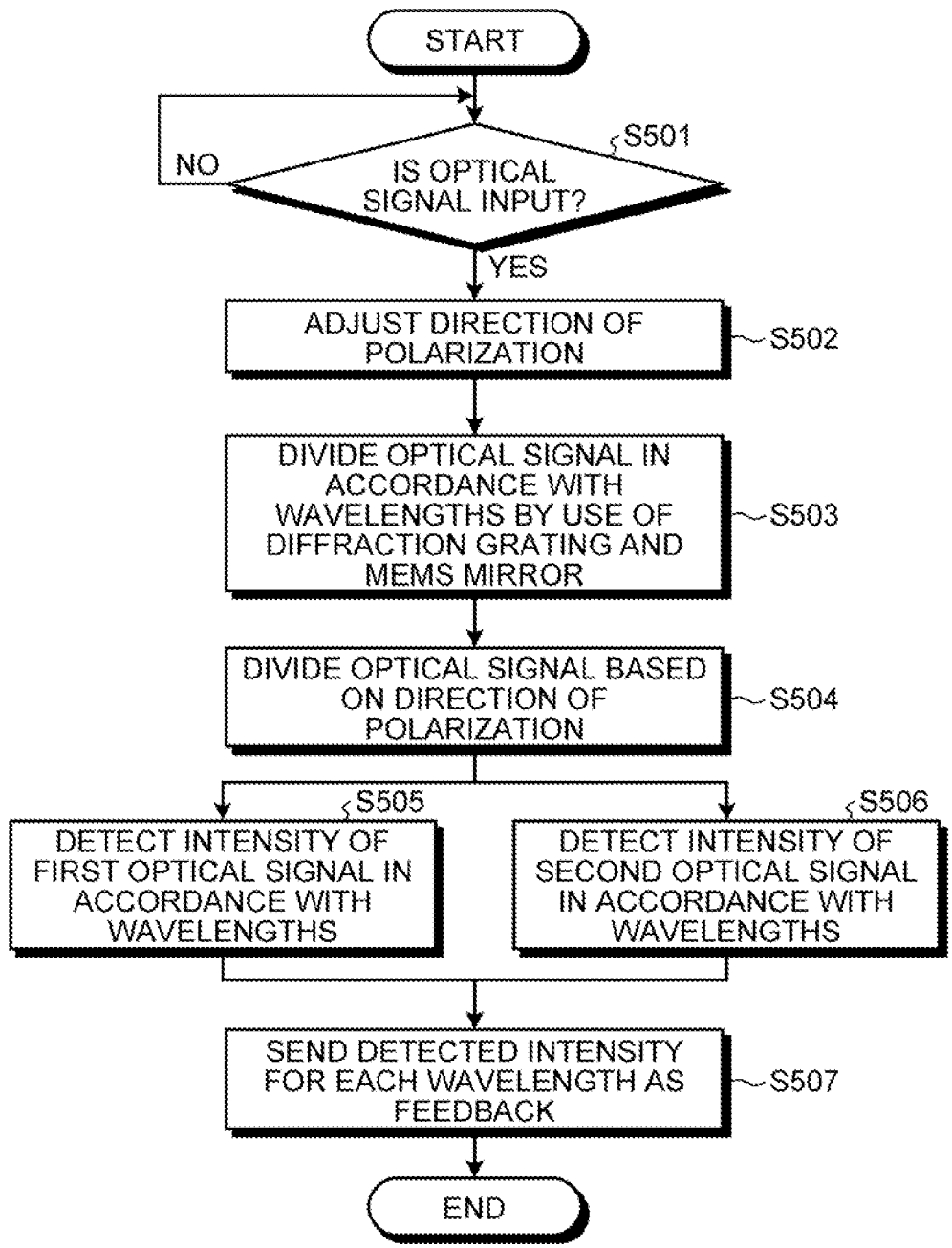
FIG. 19 is a flowchart for illustrating the procedure of a process performed by the OCM according to the ninth embodiment.

Next, the procedure of the process performed by the OCM according to the ninth embodiment is explained. FIG. 19 is a flowchart of the procedure of the process performed by the OCM according to the ninth embodiment. As illustrated in FIG. 19, the OCM according to the ninth embodiment waits until an optical signal is input through an input port (no at step S501).

When an optical signal is input through an input port (yes at step S501), the first optical system 10 of the OCM adjusts the direction of polarization of the input optical signal (step S502). More specifically, the first optical system 10 adjusts the direction of polarization of the first optical signal that is input through the input port 1 of the OCM 1 to the first direction, and the direction of polarization of the second optical signal that is input through the input port 2 of the OCM 2 to the second direction that is orthogonal to the first direction.

Then, the wavelength dividing unit 20b divides each of the optical signals multiplexed on the first and second optical signals whose directions of polarization are adjusted by the first optical system 10, in accordance with the wavelengths (step S503). More specifically, the wavelength dividing unit 20b divides each of the optical signals that are multiplexed on the first optical signal input through the input port 1 of the OCM 1 and the second optical signal input through the input port 2 of the OCM 2, in accordance with the wavelengths by use of the diffraction grating 21b and the MEMS mirror 22b.

Then, the second optical system 30 divides each of the optical signals that are divided by the wavelength dividing unit 20b in accordance with the wavelengths, into different directions based on their directions of polarization (step S504). More specifically, the second optical system 30 divides the first optical signal whose direction of polarization is adjusted to the first direction and the second optical signal whose direction of polarization is adjusted to the second direction that is orthogonal to the first direction into different travelling directions.

Then, the first intensity detecting unit 40 receives an optical signal whose direction of polarization is the first direction among the optical signals that are divided by the wavelength dividing unit 20b in accordance with the wavelengths and further divided by the second optical system 30 in accordance with the directions of polarization, and detects the intensity of the first optical signal in accordance with its wavelengths (step S505). For example, the first intensity detecting unit 40 receives, by use of the PD, the optical signal of the OCM 1 that is output by the second optical system 30 in the direction separating from the OCM 2 and has the direction of polarization vertical to the ground, and detects the intensity of the first optical signal that is input through the input port 1 of the OCM 1 in accordance with its wavelengths.

On the other hand, the second intensity detecting unit 50 receives an optical signal whose direction of polarization is the second direction among the optical signals that are divided by the wavelength dividing unit 20b in accordance with the wavelengths and further divided by the second optical system 30 in accordance with the directions of polarization, and detects the intensity of the second optical signal in accordance with the wavelengths (step S506). For example, the second intensity detecting unit 50 receives, by use of the PD, the optical signal of the OCM 2 that is output by the second optical system 30 in a direction separating from the OCM 1 and has the direction of polarization parallel to the ground, and detects the intensity of the second optical signal input through the input port 2 of the OCM 2 in accordance with the wavelengths.

Thereafter, the first intensity detecting unit 40 and the second intensity detecting unit 50 send, as feedback, the detected intensities of the optical signals of different wavelengths to the WSS controlling circuit that controls the WSS (step S507), and the process is terminated.

As discussed above, according to the ninth embodiment, the wavelength dividing unit 20b uses the diffraction grating 21b and the MEMS mirror 22b to divide the optical signals that are multiplexed on the first and second optical signals, in accordance with the wavelengths. Because the MEMS mirror can operate faster than a wavelength tunable filter, wavelength separation can be performed faster than the wavelength separation adopting a wavelength tunable filter. Furthermore, among the optical signals split by the diffraction grating, an optical signal only of a specific wavelength is reflected in the direction toward the downstream second optical system 30, and thus the first intensity detecting unit 40 and the second intensity detecting unit 50 that receive optical signals by way of the second optical system 30 do not need to be provided with a PD array.

[j] Tenth Embodiment

According to the ninth embodiment, an example of dividing, in accordance with the wavelengths, each of the optical signals multiplexed on the first and second optical signals with their directions of the planes of polarization adjusted has been explained. However, polarization multiplexing may be performed onto the first and second optical signals having their directions of the planes of polarization adjusted, and each of the optical signals multiplexed on the polarization-multiplexed first and second optical signals may be divided in accordance with the wavelengths. Thus, according to the tenth embodiment, an example of performing polarization multiplexing onto the first and second optical signals that have their directions of the planes of polarization adjusted, and dividing each of the optical signals multiplexed on the polarization-multiplexed first and second optical signals in accordance with the wavelengths is explained.

Figure 20:
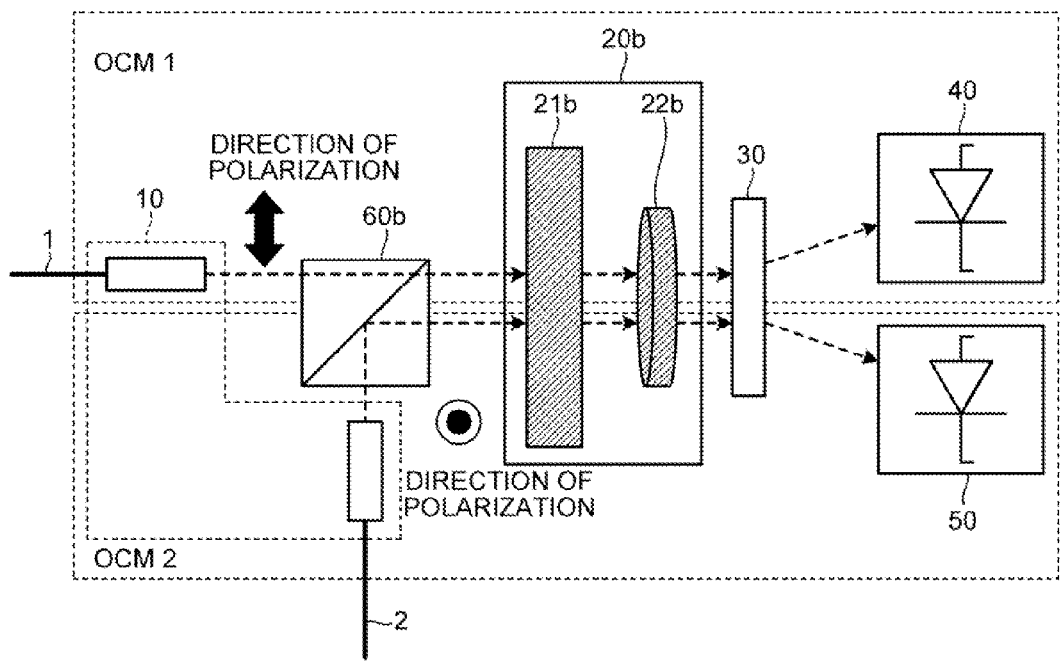
FIG. 20 is a diagram for explaining the structure of the OCM according to the tenth embodiment.

First, the structure of the OCM according to the tenth embodiment is explained. FIG. 20 is a diagram for explaining the structure of the OCM according to the tenth embodiment. In the following explanation, the same reference numerals are given to the same components that have been explained before, and the explanation of any overlapping portion may be omitted. The OCM illustrated in FIG. 20 is different from the OCM of FIG. 18 in that a polarization multiplexing signal generating unit 60b is arranged between the first optical system 10 and the wavelength dividing unit 20b.

The polarization multiplexing signal generating unit 60b performs polarization multiplexing onto the first and second optical signals whose directions of the planes of polarization are adjusted by the first optical system 10, and thereby generates a polarization multiplexing signal that includes the first and second optical signals. More specifically, the polarization multiplexing signal generating unit 60b includes a polarization beam splitter in which a dielectric multilayer that reflects an optical signal or allows it to pass through in accordance with the direction of the plane of polarization is arranged between two right angle prisms. Then, the polarization multiplexing signal generating unit 60b allows the first optical signal whose direction of polarization is adjusted to the first direction to pass through and outputs it in the direction toward the wavelength dividing unit 20b, while it reflects the second optical signal whose direction of polarization is adjusted to the second direction orthogonal to the first direction and outputs it in the direction toward the wavelength dividing unit 20b.

For example, the polarization multiplexing signal generating unit 60b allows the first optical signal of the OCM 1 whose direction of polarization is adjusted to the first direction to pass through and outputs it in the direction toward the wavelength dividing unit 20b, while it reflects the second optical signal of the OCM 2 whose direction of polarization is adjusted to the second direction that is orthogonal to the first direction and outputs it in the direction toward the wavelength dividing unit 20b. In this manner, the polarization multiplexing signal generating unit 60b brings the optical paths of the first and second optical signals whose directions of polarization are orthogonal to each other into agreement with the direction toward the wavelength dividing unit 20b, and thereby generates a polarization multiplexing signal including the first and second optical signals.

Furthermore, the wavelength dividing unit 20b divides, in accordance with the wavelengths, each of the optical signals multiplexed on the first and second optical signals that are included in the polarization multiplexing signal generated by the polarization multiplexing signal generating unit 60b. More specifically, the wavelength dividing unit 20b uses the diffraction grating 21b and the MEMS mirror 22b to divide each of the optical signals multiplexed on the first optical signal of the OCM 1 and the second optical signal of the OCM 2 that are included in the polarization multiplexing signal, in accordance with the wavelengths.

Figure 21:
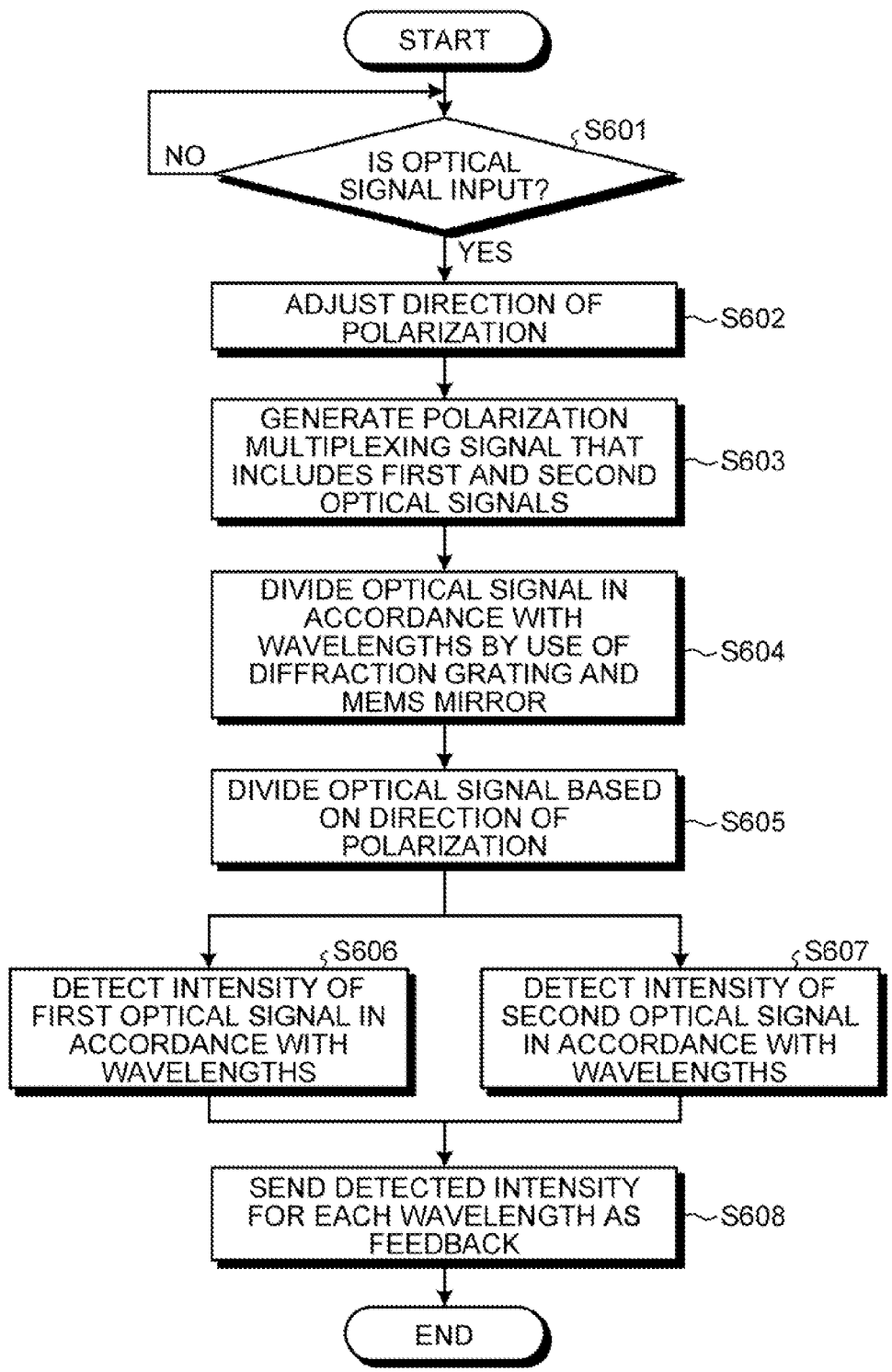
FIG. 21 is a flowchart for illustrating the procedure of a process performed by the OCM according to the tenth embodiment.

Next, the procedure of the process performed by the OCM according to the tenth embodiment is explained. FIG. 21 is a flowchart of the procedure of the process performed by the OCM according to the tenth embodiment. As indicated in FIG. 21, the OCM according to the tenth embodiment waits until an optical signal is input through an input port (no at step S601).

When an optical signal is input through an input port (yes at step S601), the first optical system 10 of the OCM adjusts the direction of polarization of the input optical signal (step S602). More specifically, the first optical system 10 adjusts the direction of polarization of the first optical signal that is input through the input port 1 of the OCM 1 to the first direction, and the direction of polarization of the second optical signal that is input through the input port 2 of the OCM 2 to the second direction that is orthogonal to the first direction.

Then, the polarization multiplexing signal generating unit 60b performs polarization multiplexing onto the first and second optical signals whose directions of the planes of polarization are adjusted by the first optical system 10, and generates a polarization multiplexing signal that includes the first and second optical signals (step S603). More specifically, the polarization multiplexing signal generating unit 60b is provided with a polarization beam splitter in which a dielectric multilayer that reflects an optical signal or allows it to pass through in accordance with the direction of the plane of polarization is arranged between two right angle prisms. Then, the polarization multiplexing signal generating unit 60b allows the first optical signal whose direction of polarization is adjusted to the first direction to pass through and outputs it in the direction toward the wavelength dividing unit 20b, while it reflects the second optical signal whose direction of polarization is adjusted to the second direction that is orthogonal to the first direction and outputs it in the direction toward the wavelength dividing unit 20b.

Then, the wavelength dividing unit 20b divides, in accordance with the wavelengths, each of the optical signals multiplexed on the first and second optical signals that are included in the polarization multiplexing signal generated by the polarization multiplexing signal generating unit 60b (step S604). More specifically, the wavelength dividing unit 20b divides, by use of the diffraction grating 21b and the MEMS mirror 22b, each of the optical signals multiplexed on the first optical signal of the OCM 1 and the second optical signal of the OCM 2 divides that are included in the polarization multiplexing signal, in accordance with the wavelengths. The operations at steps S605 through S608 are the same as steps S504 through 5507 of FIG. 19, and thus the explanation thereof is omitted here.

As discussed above, according to the tenth embodiment, the polarization multiplexing signal generating unit 60b performs polarization multiplexing onto the first and second optical signals whose directions of the planes of polarization are adjusted by the first optical system 10, and generates a polarization multiplexing signal that includes the first and second optical signals. Then, the wavelength dividing unit 20b divides each of the optical signals multiplexed on the first and second optical signals that are included in the polarization multiplexing signal generated by the polarization multiplexing signal generating unit 60b, in accordance with the wavelengths. For this reason, the optical paths of the optical signals whose directions of polarization are orthogonal to each other are both brought into agreement with the wavelength dividing unit 20b before the wavelength separation is conducted, and thus the space occupied by the wavelength dividing unit 20b can be reduced. As a result, the apparatus that includes multiple OCMs can be further downsized.

[k] Eleventh Embodiment

According to the ninth embodiment, an example of dividing an input optical signal based on the direction of the plane of polarization by use of a polarization beam splitter that includes birefringent crystal has been explained. However, a polarization beam splitter that includes a dielectric multilayer to reflect an optical signal or allow it to pass through in accordance with the direction of the plane of polarization may be adopted to divide the input optical signal based on the direction of the plane of polarization. Thus, according to the eleventh embodiment, an example of dividing the input optical signal based on the direction of the plane of polarization by use of a polarization beam splitter that includes a dielectric multilayer to reflect an optical signal or allow it to pass through in accordance with the direction of the plane of polarization is explained.

Figure 22:
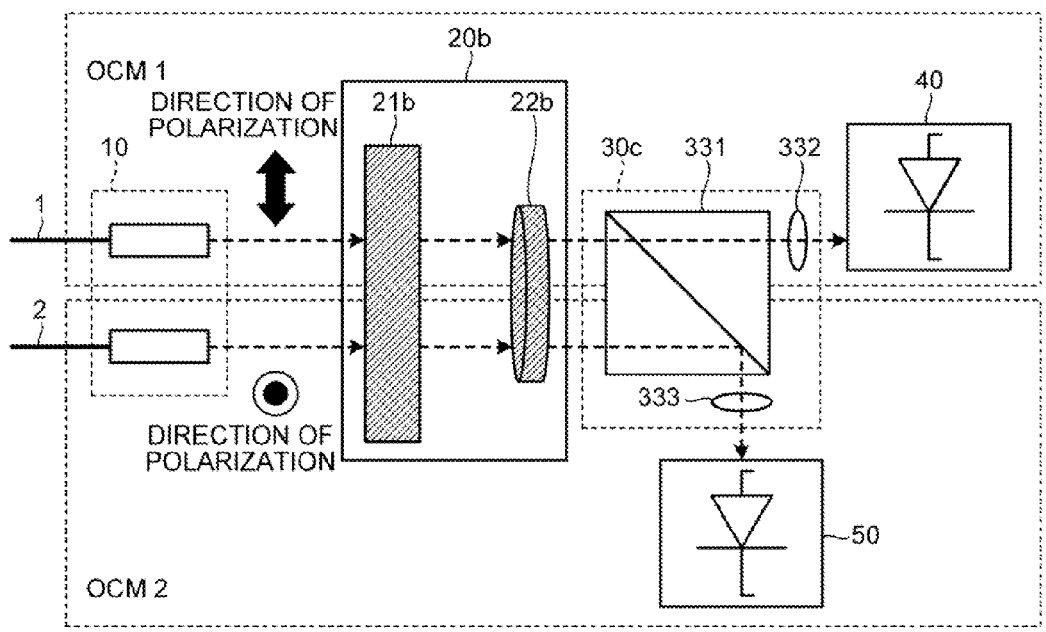
FIG. 22 is a diagram for explaining the structure of the OCM according to the eleventh embodiment.

FIG. 22 is a diagram for explaining the structure of the OCM according to the eleventh embodiment. In the following explanation, the same reference numerals are given to the same components that have been explained before, and the explanation of any overlapping portion may be omitted. The OCM illustrated in FIG. 22 is different from the OCM of FIG. 18 in that a second optical system 30c is included in place of the second optical system 30.

The second optical system 30c divides the optical signals divided by the wavelength dividing unit 20b in accordance with the wavelengths, into different directions based on the direction of the plane of polarization. More specifically, the second optical system 30c includes a polarization beam splitter 331 in which a dielectric multilayer that reflects an optical signal or allows it to pass through in accordance with the direction of the plane of polarization is interposed between two right angle prisms. Then, the second optical system 30c allows the input optical signal whose direction of polarization is the first direction to pass through and outputs it in the direction toward the first intensity detecting unit 40, while it reflects the input optical signal whose direction of polarization is the second direction that is orthogonal to the first direction and outputs it in the direction toward the second intensity detecting unit 50. Then, the second optical system 30c uses a lens 332 and a lens 333 arranged downstream of the polarization beam splitter 331 to collect the optical signals divided in the directions toward the first intensity detecting unit 40 and the second intensity detecting unit 50, respectively.

For example, the second optical system 30c outputs the optical signal of the OCM 1 whose direction of polarization is vertical to the ground in the direction toward the first intensity detecting unit 40, and outputs the optical signal of the OCM 2 whose direction of polarization is parallel to the ground in the direction toward the second intensity detecting unit 50. Moreover, the second optical system 30c collects the optical signal of the OCM 1 that is output in the direction toward the first intensity detecting unit 40, and also the optical signal of the OCM 2 that is output in the direction toward the second intensity detecting unit 50, thereby dividing the optical signal of the OCM 1 and the optical signal of the OCM 2 into directions separating from each other. The procedure of the process performed by the OCM according to the eleventh embodiment is the same as the procedure of the process performed by the OCM according to the ninth embodiment, and thus the explanation thereof is omitted here.

As described above, according to the eleventh embodiment, the second optical system 30c uses the polarization beam splitter that includes a dielectric multilayer to reflect an optical signal or allow it to pass through in accordance with the direction of the plane of polarization and thereby divides the input optical signal into different directions based on the direction of the plane of polarization. For this reason, the two optical signals whose directions of the planes of polarization are orthogonal to each other can be easily divided in directions separating from each other, and crosstalk can be effectively avoided. Furthermore, a polarization beam splitter that includes a dielectric multilayer is generally less expensive than a polarization beam splitter that includes a birefringent crystal. Because crosstalk can be avoided without using a polarization beam splitter provided with a birefringent crystal, costs can be reduced.

[l] Twelfth Embodiment

According to the tenth embodiment, an example of dividing an input optical signal based on the direction of the plane of polarization by use of a polarization beam splitter that includes a birefringent crystal has been explained. However, a polarization beam splitter having a dielectric multilayer that reflects an optical signal or allows it to pass through in accordance with the direction of the plane of polarization may be adopted to divide an input optical signal based on the direction of the plane of polarization. According to the twelfth embodiment, an example of separating an input optical signal based on the direction of the plane of polarization by use of a polarization beam splitter having a dielectric multilayer that reflects an optical signal or allows it to pass through in accordance with the direction of the plane of polarization is explained.

Figure 23:
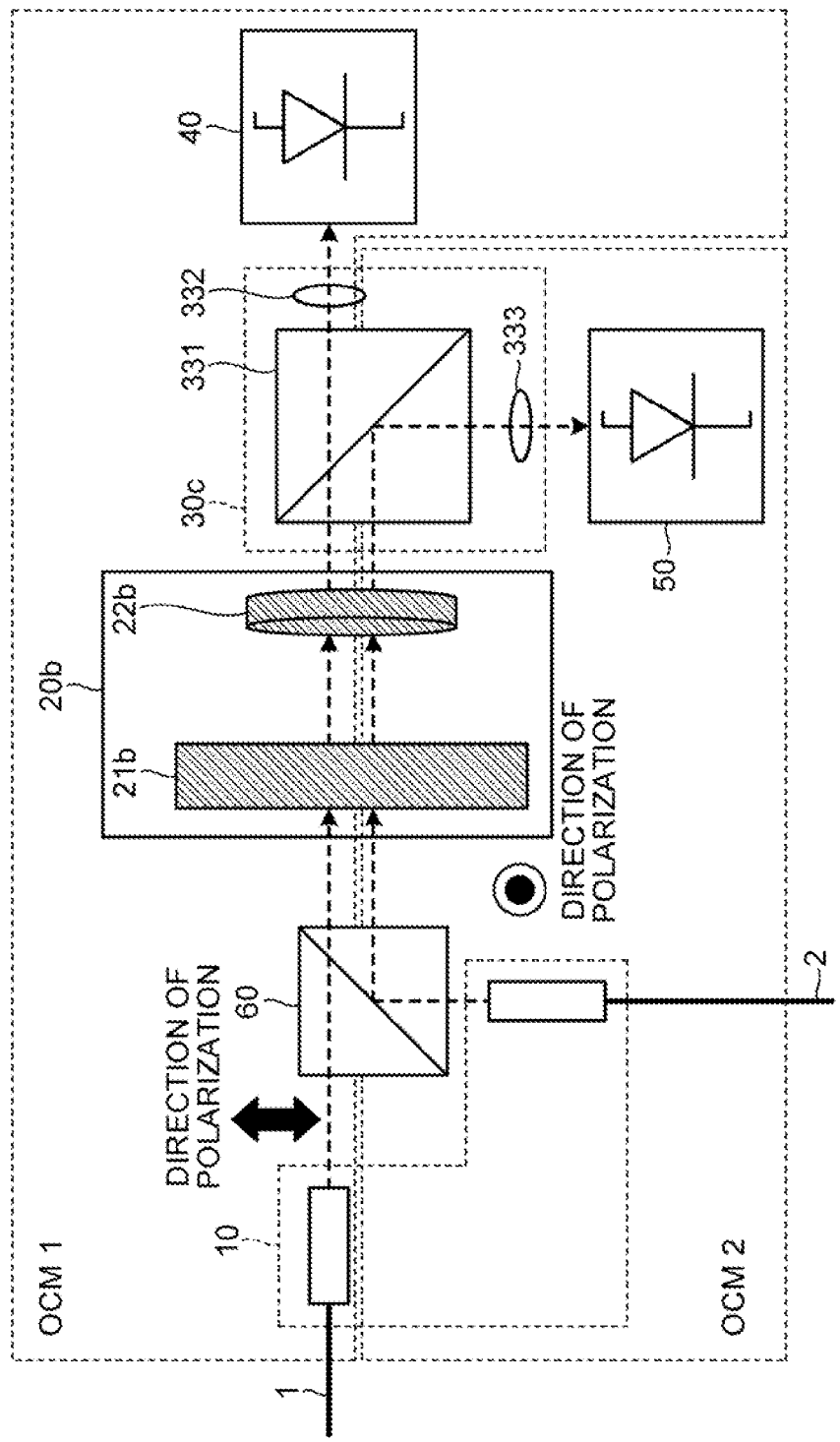
FIG. 23 is a diagram for explaining the structure of the OCM according to the twelfth embodiment.
Figure 24:
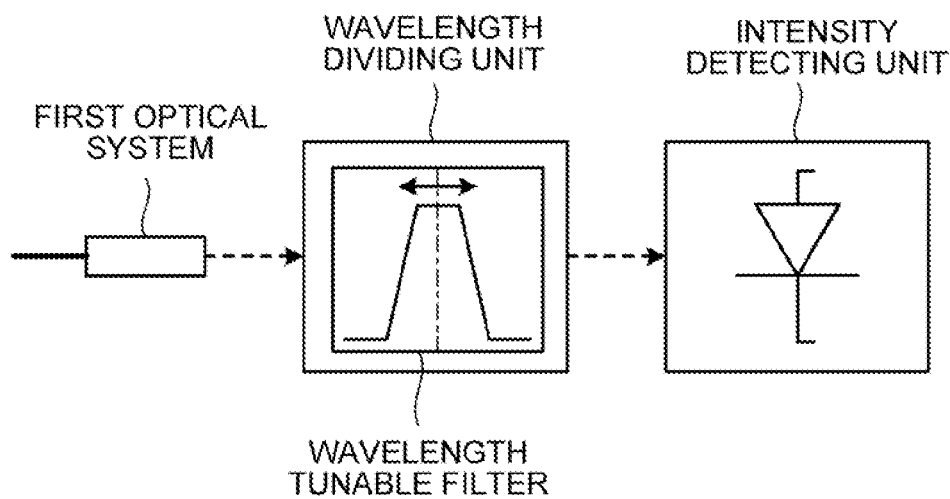
FIG. 24 is a diagram for explaining an example of a conventional OCM.
Figure 25:
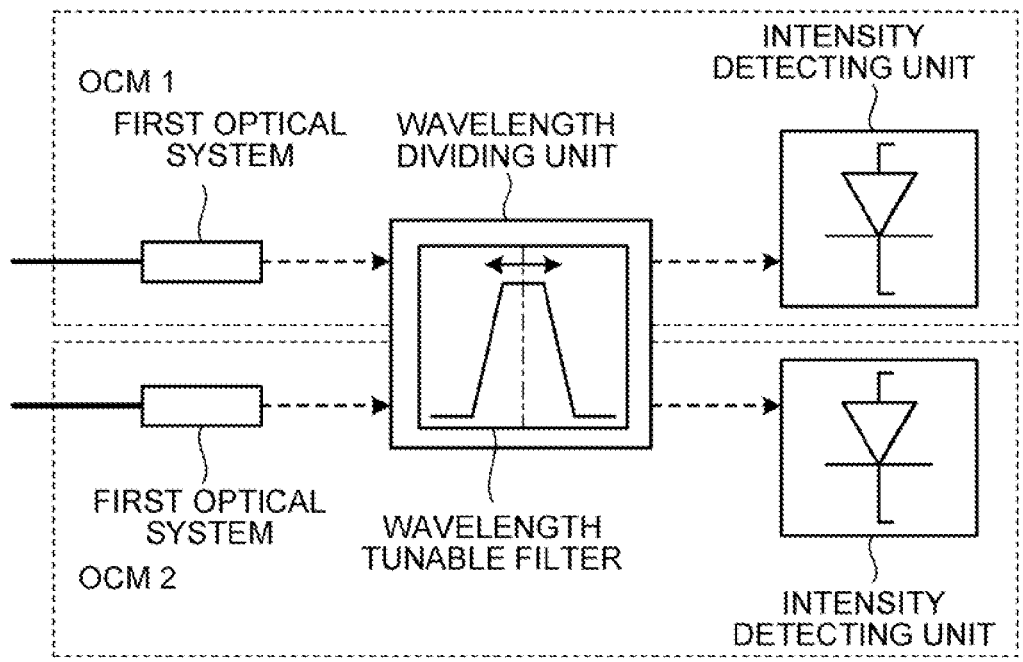
FIG. 25 is a diagram for explaining a structure in which two OCMs are combined.

FIG. 23 is a diagram for explaining the structure of the OCM according to the twelfth embodiment. In the following explanation, the same reference numerals are given to the same components that have been explained before, and the explanation of any overlapping portion may be omitted. The OCM illustrated in FIG. 23 is different from the OCM of FIG. 20 in that the second optical system 30c is included in place of the second optical system 30. The second optical system 30c is the same as that of the eleventh embodiment, and thus the explanation thereof is omitted here. In addition, the procedure of the process performed by the OCM according to the twelfth embodiment is the same as the procedure of the process performed by the OCM according to the tenth embodiment, and thus the explanation thereof is omitted here.

As described above, according to the twelfth embodiment, the second optical system 30c uses a polarization beam splitter having a dielectric multilayer that reflects an optical signal or allows it to pass through in accordance with the direction of the plane of polarization to divide the input optical signal into different directions based on the direction of the plane of polarization. Thus, the two optical signals whose directions of the planes of polarization are orthogonal to each other can be easily divided in directions separating from each other, and crosstalk can be effectively avoided. Furthermore, a polarization beam splitter that includes a dielectric multilayer is generally less expensive than a polarization beam splitter that includes a birefringent crystal, and because crosstalk can be avoided without adopting a polarization beam splitter that includes a birefringent crystal, costs can be reduced.

With optical channel monitors according to an embodiment of the present invention, an apparatus having multiple OCMs can be downsized, and crosstalk can be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical channel monitor, comprising:
a polarization adjuster configured to adjust, of a first optical signal and a second optical signal that are multiple wavelength light, a direction of a plane of polarization of the first optical signal to a first direction and a direction of a plane of polarization of the second optical signal to a second direction that is orthogonal to the first direction;
a polarization multiplexing signal generator configured to perform polarization multiplexing onto the first optical signal and the second optical signal each having the direction of the plane of polarization adjusted by the polarization adjuster to generate a polarization multiplexing signal that includes the first optical signal and the second optical signal;
a wavelength divider configured to divide each of optical signals that are multiplexed on the first optical signal and the second optical signal that are included in the polarization multiplexing signal, in accordance with wavelengths;
a polarization divider configured to divide each of the optical signals divided by the wavelength divider in accordance with the wavelengths, based on the direction of the plane of polarization;
a first intensity detector configured to receive an optical signal whose direction of the plane of polarization is the first direction from among the optical signals divided by the polarization divider, and detect an intensity of the first optical signal in accordance with the wavelengths; and
a second intensity detector configured to receive an optical signal whose direction of the plane of polarization is the second direction from among the optical signals divided by the polarization divider and detect an intensity of the second optical signal in accordance with the wavelengths.

2. The optical channel monitor according to claim 1, wherein the polarization divider incorporates a polarization beam splitter that includes birefringent crystal in which two crystals whose optical axes are orthogonal to each other are diagonally attached together, and thereby divides each of the optical signals divided by the wavelength divider in accordance with the wavelengths, into different directions based on the direction of the plane of polarization.

3. The optical channel monitor according to claim 1, wherein the polarization divider incorporates a polarization beam splitter having a dielectric multilayer that reflects an optical signal or allows it to pass in accordance with the direction of the plane of polarization, and thereby divides each of the optical signals divided by the wavelength divider in accordance with the wavelengths, into different directions based on the direction of the plane of polarization.

4. The optical channel monitor according to claim 1, wherein the wavelength divider incorporates a wavelength tunable filter that allows an optical signal of a specific wavelength to pass through, and thereby divides each of the optical signals multiplexed on the first optical signal and the second optical signal, in accordance with the wavelengths.

5. The optical channel monitor according to claim 1, wherein the wavelength divider incorporates a diffraction grating that splits an input optical signal into different directions in accordance with the wavelengths, and thereby divides each of the optical signals multiplexed on the first optical signal and the second optical signal, in accordance with the wavelengths.

6. The optical channel monitor according to claim 1, wherein the wavelength divider incorporates a diffraction grating that splits an input optical signal into different directions in accordance with the wavelengths and a MEMS mirror that reflects an optical signal of a specific wavelength to a downstream direction among the optical signals split by the diffraction grating in accordance with the wavelengths, and thereby divides each of the optical signals multiplexed on the first optical signal and the second optical signal, in accordance with the wavelengths.

7. An optical transmission apparatus, comprising:
  a polarization adjuster configured to adjust, of a first optical signal that is multiple wavelength light output from a first wavelength selectable switch and a second optical signal that is multiple wavelength light output from a second wavelength selectable switch, a plane of polarization of the first optical signal to a first direction, and a plane of polarization of the second optical signal to the second direction that is orthogonal to the first direction;
  a wavelength divider configured to divide optical signals that are multiplexed on the first optical signal and the second optical signal each having the direction of the plane of polarization adjusted by the polarization adjuster, in accordance with wavelengths;
  a polarization divider configured to divide each of the optical signals divided by the wavelength divider in accordance with the wavelengths, based on the direction of the plane of polarization;
  a first intensity detector configured to receive an optical signal whose direction of the plane of polarization is the first direction among the optical signals divided by the polarization divider and detect an intensity of the first optical signal in accordance with the wavelengths;
  a second intensity detector configured to receive an optical signal whose direction of the plane of polarization is the second direction among the optical signals divided by the polarization divider and detect an intensity of the second optical signal in accordance with the wavelengths;
  a first wavelength selectable switch controller configured to control an amount of attenuation for each of the wavelengths at the first wavelength selectable switch in such a manner that the intensity of the first optical signal that is detected by the first intensity detector in accordance with the wavelengths reaches a target value; and
  a second wavelength selectable switch controller configured to control an amount of attenuation for each wavelength at the second wavelength selectable switch in such a manner that the intensity of the second optical signal detected by the second intensity detector in accordance with the wavelengths reaches a target value.

* * * * *